(12) United States Patent
Motz et al.

(10) Patent No.: US 9,422,129 B2
(45) Date of Patent: Aug. 23, 2016

(54) APPARATUS AND METHODS FOR FACILITATING THE REMOVAL OF EXISTING TURF AND INSTALLING NEW TURF

(71) Applicant: Technology Licensing Corporation, Newtown, OH (US)

(72) Inventors: Joseph E. Motz, Cincinnati, OH (US); David P. Motz, Cincinnati, OH (US)

(73) Assignee: Technology Licensing Corporation, Newtown, OH (US)

( * ) Notice: Subject to any disclaimer, the term of this patent is extended or adjusted under 35 U.S.C. 154(b) by 488 days.

(21) Appl. No.: 13/965,738

(22) Filed: Aug. 13, 2013

(65) Prior Publication Data
US 2013/0330156 A1  Dec. 12, 2013

Related U.S. Application Data

(63) Continuation of application No. 13/793,353, filed on Mar. 11, 2013, now Pat. No. 9,010,450, which is a continuation of application No. PCT/US2012/033829, filed on Apr. 16, 2012, and a continuation of (Continued)

(51) Int. Cl.
*B65H 18/10* (2006.01)
*A01G 1/00* (2006.01)
(Continued)

(52) U.S. Cl.
CPC ............... *B65H 18/10* (2013.01); *A01G 1/004* (2013.01); *B60P 1/00* (2013.01); *E01C 13/08* (2013.01);
(Continued)

(58) Field of Classification Search
CPC ......... A01B 45/04; B65H 18/10; E01C 13/08
See application file for complete search history.

(56) References Cited

U.S. PATENT DOCUMENTS 2,778,292 A * 1/1957 Charles .................. A01B 45/04
172/19
3,257,785 A 6/1966 Rimes
(Continued)

FOREIGN PATENT DOCUMENTS

JP 3266913 11/1991
WO 2010094576 8/2010
WO 2012142610 10/2012

OTHER PUBLICATIONS

United States Patent and Trademark Office, International Search Report and Written Opinion for PCT/US2012/33829, Sep. 21, 2012.

(Continued)

*Primary Examiner* — Jonathan Snelting
(74) *Attorney, Agent, or Firm* — Wood, Herron & Evans, LLP

(57) ABSTRACT

A turf cutter device, an infill extractor/collector device, and a turf wind-up device are used to facilitate the cost-effective removal of an infilled synthetic turf and the subsequent installation of a new turf at the same site, with minimal subsurface disruption. An infill extractor/collector device mounted on a motorized vehicle moves a relatively narrow strip of filled artificial turf from the surface, in front of the vehicle, and directs the strip to an infill removal station. The infill removal station inverts the strip and redirects the strip back toward the front of the vehicle, after agitating the strip to extract the infill. After redirecting the strip toward the front of the vehicle, the vehicle drives over the unfilled strip. Meanwhile, the extractor/collector device moves the extracted infill rearwardly to a bag located in a trailer. The turf cutter device is used prior to infill extraction, while the turf wind up device may be used before or after infill extraction, depending on whether infill extraction takes place at the field or at a remote site, respectively.

8 Claims, 21 Drawing Sheets

Related U.S. Application Data application No. 13/206,723, filed on Aug. 10, 2011, now Pat. No. 8,974,311.

(60) Provisional application No. 61/606,808, filed on Mar. 5, 2012, provisional application No. 61/475,508, filed on Apr. 14, 2011.

(51) Int. Cl.
| | |
|---|---|
| *E01C 13/08* | (2006.01) |
| *B60P 1/00* | (2006.01) |
| *E01C 19/52* | (2006.01) |
| *E01C 23/00* | (2006.01) |

(52) U.S. Cl.
CPC .............. *E01C 19/522* (2013.01); *E01C 23/00* (2013.01); *Y10T 83/0605* (2015.04); *Y10T 83/7755* (2015.04); *Y10T 83/7793* (2015.04)

(56) References Cited

U.S. PATENT DOCUMENTS

| | | | | |
|---|---|---|---|---|
| 3,812,918 A | * | 5/1974 | Beck | A01B 45/04 172/19 |
| 4,084,763 A | * | 4/1978 | Zamboni | A01B 45/04 242/393 |
| 4,394,052 A | * | 7/1983 | Adams | E04G 23/006 242/539 |
| 4,754,815 A | * | 7/1988 | Brouwer | A01B 45/04 111/100 |
| 4,892,153 A | * | 1/1990 | Cooling | A01B 45/04 172/20 |
| 5,070,687 A | | 12/1991 | Schweigert | |
| 5,129,462 A | * | 7/1992 | Mail | A01B 45/04 111/901 |
| 5,307,880 A | | 5/1994 | Woerner | |
| 5,902,414 A | | 5/1999 | Keal et al. | |
| 6,131,668 A | * | 10/2000 | Houska | A01B 45/04 172/19 |
| 6,655,469 B1 | | 12/2003 | Davis | |
| 2003/0037388 A1 | | 2/2003 | Feyma et al. | |
| 2008/0282663 A1 | | 11/2008 | Dunning et al. | |
| 2010/0001115 A1 | | 1/2010 | Jonsson | |
| 2010/0319510 A1 | | 12/2010 | Bearden | |
| 2012/0006930 A1 | | 1/2012 | Mitchell | |
| 2012/0017939 A1 | | 1/2012 | Davis et al. | |
| 2012/0096661 A1 | | 4/2012 | Pizano et al. | |
| 2013/0017023 A1 | | 1/2013 | Nicholls et al. | |

OTHER PUBLICATIONS

The International Bureau of WIPO, Notification Concerning Transmittal of International Preliminary Report on Patentability (Chapter I of the Patent Cooperation Treaty) for PCT/US2012/033829, Oct. 24, 2013.

United States Patent and Trademark Office, Notice of Transmittal of and International Search Report and Written Opinion for PCT/US2014/25514, Nov. 7, 2014.

\* cited by examiner

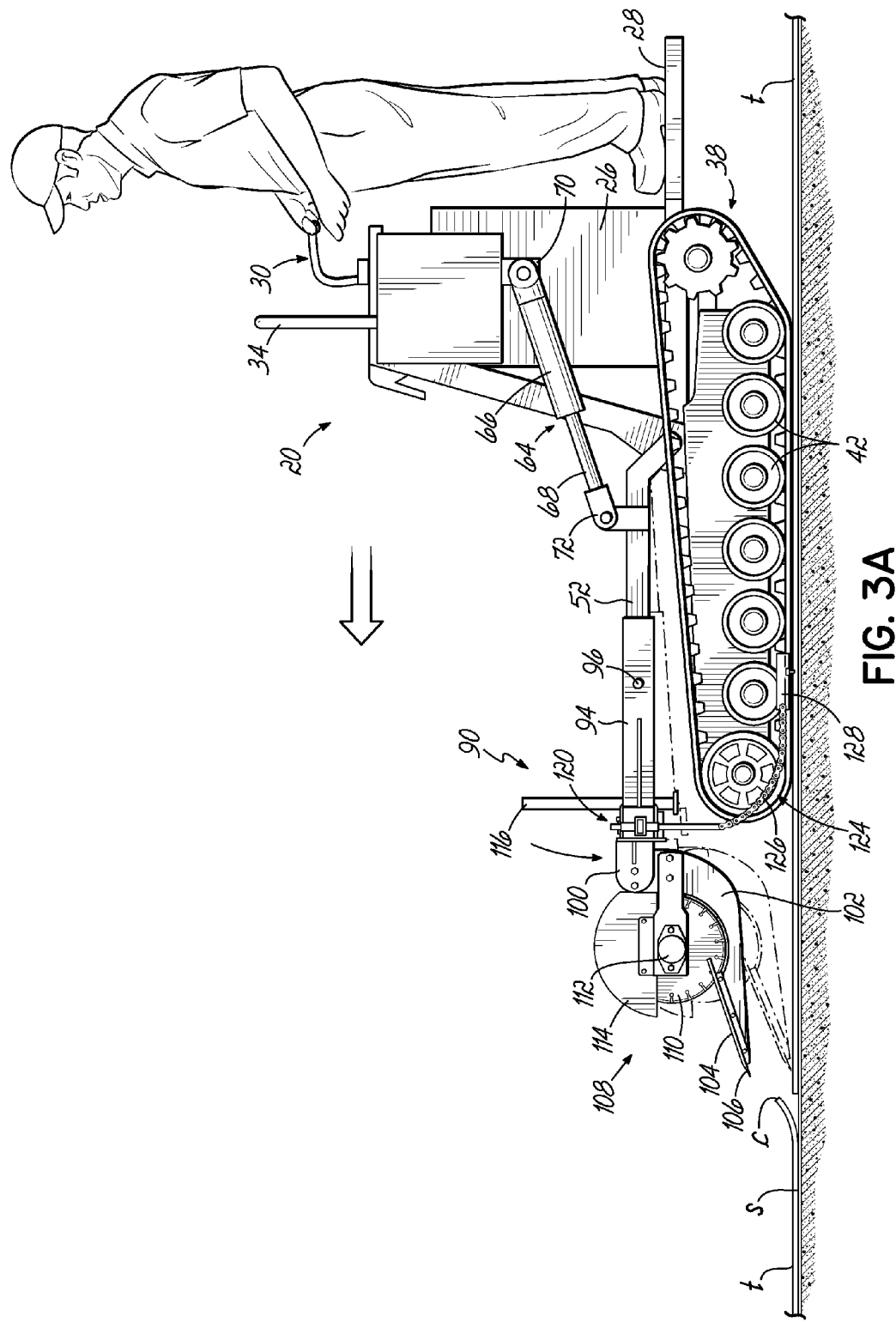

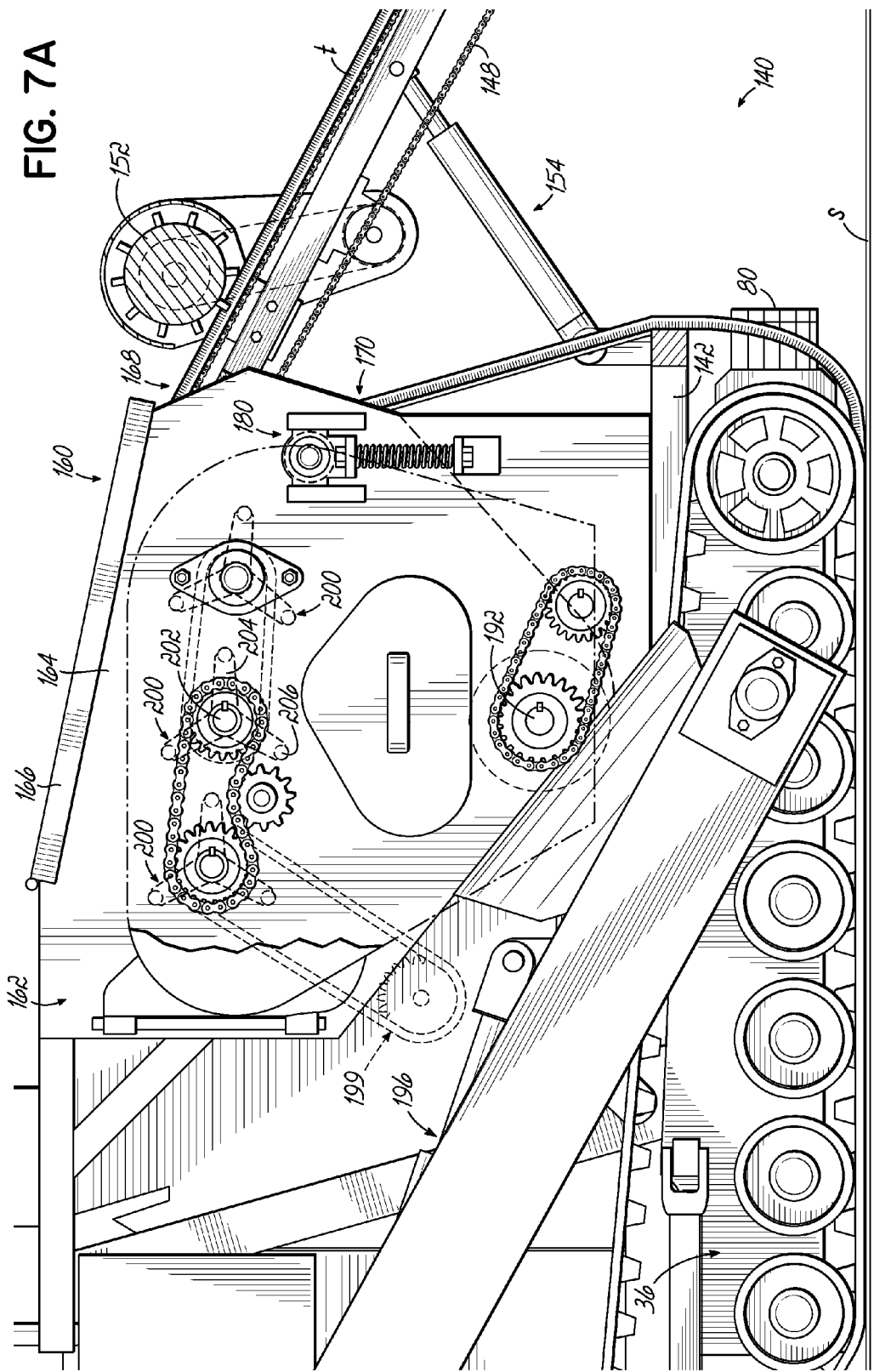

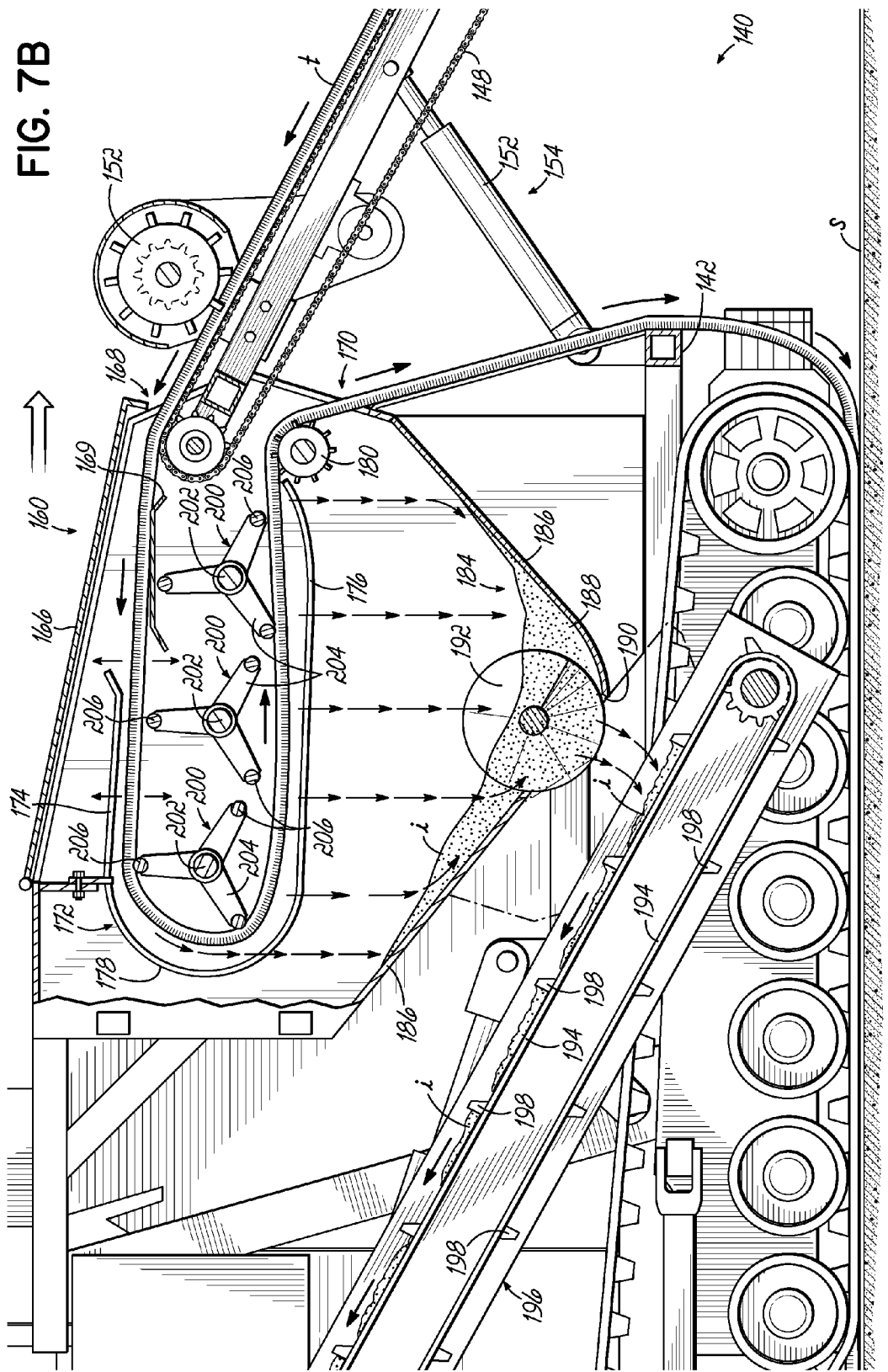

APPARATUS AND METHODS FOR FACILITATING THE REMOVAL OF EXISTING TURF AND INSTALLING NEW TURF

RELATED APPLICATION

This application is a continuation of U.S. patent application Ser. No. 13/793,353, filed Mar. 11, 2013, the content of which is hereby incorporated by reference into this application in its entirety. U.S. patent application Ser. No. 13/793,353 claimed priority, under Section 120 and/or Section 371, to PCT patent Application No. PCT/US2012/033829, filed on Apr. 16, 2012, which in turn claimed priority to U.S. Provisional Patent Application No. 61/606,808, filed Mar. 5, 2012, to U.S. Provisional Patent Application No. 61/475,508, filed Apr. 14, 2011, and also to presently pending U.S. patent application Ser. No. 13/206,723, filed Aug. 10, 2011, the contents of all of which are hereby incorporated by reference into this application, in their entireties.

FIELD OF THE INVENTION

The present invention relates to infilled synthetic turf, and particularly to apparatus and methods for removing an existing infilled synthetic turf and extracting and collecting the particulate infill. The present invention also contemplates the facilitated installation of a new infilled synthetic turf.

BACKGROUND OF THE INVENTION

Synthetic turf continues to gain popularity, as an athletic field surface for professional teams, college teams, high school teams, and even public parks. Current types of athletic turf simulate natural grass very well, while eliminating the typical costs associated with maintaining a natural turf, such as watering, mowing, fertilizing, and even replacing the worn turf when bare spots occur.

There are any number of reasons why a synthetic turf may need to be replaced, including decreased playability, loss of aesthetic appeal, warranty expiration, or perhaps even safety concerns. Regardless of the one or more reasons that may apply to any specific synthetic turf, there comes a time when the synthetic turf must be removed from the site, and in all likelihood, another synthetic turf put down in its place.

Owners of synthetic fields have become accustomed to virtual round-the-clock use of their synthetic turf athletic fields. For this and other reasons, it is important that the removal of an existing synthetic turf, and its replacement with a new synthetic turf, occur as efficiently as possible. Also, the components of a removed synthetic turf are often reused or recycled for other purposes. Therefore, it is also desirable to remove a synthetic field in a manner that readily facilitates such reuse or recycling.

One conventional process for removing synthetic turf has typically involved using a bobcat with claw attachments to simply rip and tear through the seams of the existing turf, to literally eat through the field so that it can be stripped from the site. In such instances, it is difficult or time consuming to reuse or recycle the ripped out turf. Also, the use of a bobcat in this manner, to tear out an existing synthetic turf, will inevitably disrupt the carefully compacted and leveled subsurface that resides beneath the synthetic turf. In such instances where the subsurface is disrupted, the subsurface will need to be reconstructed prior to the placement of a new synthetic turf on the same site. This replacement or reconstruction of the subsurface adds to the time and costs associated with installing a new synthetic turf.

Most infilled synthetic turfs use an infill of sand, rubber, or a combination of sand and rubber. The particulate nature of such infill materials, and the weight thereof, can lead to complications in removing the synthetic turf. Moreover, the particulate infill is valuable, and may have a useful lifetime that is longer than the useful lifetime of the synthetic turf fibers.

Others have tried different methods or devices for removing a synthetic turf from a site. For instance, a product called TurfMuncher, apparently being commercialized by a company called FieldAway, is shown and described at www.fieldaway.com. Another existing device is referred to as the CarpetEater, and can be found at www.carlrennen.nl. The device shown at this site seems to be the subject of EP 2 387 875, entitled "Infill Removal Device For Removing Infill From A Strip Of Artificial Turf."

The state of the art can further be understood via the following patent references: 1) U.S. Patent Publication No. 2010/0001115, entitled "Apparatus And Method For Handling an Artificial Turf Arranged On A Base;" 2) U.S. Patent Publication No. 2012/0006930, entitled "Artificial Turf Remover And Infill Separator, And Method Of Use Thereof;" 2) U.S. Patent Publication No. 2010/0319510, entitled "Apparatus For Colleting Artificial Turf For Recycling;" 4) WO2010/094576, entitled "Recycling Of Artificial Turf;" and 5) Japanese Patent Publication No. JP200000831482. The above-referenced U.S. '510 publication provides a good general description of some of the practical problems associated with removing a synthetic turf.

For one reason or another, the state of the art has not yet adequately addressed the practical concerns associated with removing an infilled synthetic turf and installing a new turf.

SUMMARY OF THE INVENTION

It is an object of the present invention to reduce the time and cost associated with removing an existing infilled synthetic turf and/or replacing the existing turf with a new turf.

It is another object of the present invention to facilitate the reuse and/or recycling of components of an existing infilled synthetic turf.

It is still another object of the present invention to minimize the disruption caused to the prepared subsurface during the removal of an existing infilled artificial infill synthetic turf and/or the installation of a new infilled synthetic turf, and also to protect any surrounding susceptible surfaces.

It is still another object of the present invention to simplify the procedures associated with, and the equipment used in, removing an existing infilled synthetic turf and/or installing a new infilled synthetic turf.

To achieve one or more of these objects, in a general sense, and according to one preferred embodiment of the invention, the present invention relies on a modified vehicle of the type shown in U.S. Pat. No. 5,307,880, and various implements that are able to connect thereto, so as to enable a high degree of versatility in removing an infilled synthetic turf and replacing it with another. For instance, the invention contemplates a removal process that involves cutting the field into relatively narrow strips, with a cutter device, then extracting and collecting the infill from the strips but placing the strips back onto the subsurface, with an extractor/collector device, followed by winding up the unfilled strips with a turf wind up device. These devices are designed to work with relatively narrow strips of turf, preferably about 45 inches. This relatively narrow width reduces problems associated with overly large and heavy rolls of turf, whether filled or infilled. The relatively narrow width of these strips makes the entire process more manageable, and takes into consideration one presumption, namely, that the artificial turf itself will not be reused as a turf for a large field, i.e., it is worn out and/or not reusable.

According to one aspect of the invention, one or more of these above-described devices may be removably attachable to the motorized vehicle. The ability to removably attach one or more of these device, and the concurrent use of more than one vehicle during the removal of an infilled turf, can reduce the overall time needed to remove the turf. Moreover, each of the devices is operable with the vehicle so as to substantially minimize direct contact with the subsurface, or to eliminate such contact altogether. Preferably, the motorized vehicle is supported on two spaced endless loop treads, so that the force per unit area remains relatively low, due to the even distribution of the weight of the vehicle and the accompanying devices.

The shape, configuration, and operation of the extractor/collector causes the accompanying vehicle to be seldom driven on the subsurface. And even if driving on the subsurface does occur, the treads of the vehicle help to evenly distribute this weight, as noted above. Moreover, this same principle applies with respect to cutting an existing turf into strips, when the cutting device is used. That is, the cutting device is also shaped and configured so that it does not require any contact with the subsurface during cutting. Still further, during cutting the cutting device enables the next set of cut lines to be marked, if desired, for the next adjacent rows.

Still further, contact with the subsurface can also be avoided when winding up the infilled turf, simply by locating the wind up device at one end of the strip so as to remain stationary during the wind up procedure, to pull the unfilled turf across the subsurface. This is doable because the strip has a width that is relatively low, i.e. about 45 inches, and because it is unfilled so that the weight is relatively low. The advantage of leaving the wind up device stationary is that the subsurface remains untouched as the turf is removed.

Also, or in alternative, the use of a relatively narrow width enables an existing field to be, first, cut into strips, and then second, wound up with the strips remaining in a filled condition, and the wind up device remaining stationary and located at the side of the field. Under this scenario, as opposed to on-site infill extraction, the filled strips could be shipped to a processing site for extraction and collection of the infill, most likely from a stationary extractor/collector. This arrangement would facilitate ongoing reprocessing and/or recycling of the infill and the removal of turf in a continuous operation serving multiple fields and/or geographical regions via one fixed regional extractor/collector site.

According to one preferred aspect of the invention, the vehicle is easily maneuverable to connect the desired devices. In a typical operation, an existing field is first cut into strips of desired width, using the cutting device. Thereafter, the infill is extracted and collected from the strips, using the extractor/collector device. Then, the unfilled strips are collected using the wind-up device. Because these devices can be removably connected to the same vehicle, the simultaneous use of multiple vehicles will speed up the process. Thus, according to this aspect of the invention, to optimize versatility and interchangeability, all of the devices are removably connectable to one type of motorized vehicle. Thus, if a contractor has two vehicles, any two of the devices can be used at the same time.

Alternatively, one of the vehicles may be dedicated for full time use with the extractor/collector device. This alternative approach may be preferred because the power requirements for the extractor/collector device are substantially greater than those of either the cutter device or the wind up device.

Moreover, the extractor/collector procedure is more time consuming than the other two procedures. So according to this alternative, i.e., the second preferred embodiment, one higher powered vehicle remains dedicated to the infill extractor/collector, while a separate vehicle is used for cutting and winding up the turf, via interchangeable use of the turf cutter and the turf wind up devices.

With respect to infill removal, the extractor/collector has three primary sections, an input section, which includes a ramp, an infill removal section, and an infill collection section. The ramp facilitates initiation of the removal process. That is, due to the shape and orientation of the ramp, an operator has a clear line of sight to the leading edge of the strip of turf to be removed. Also, the apparatus enables the operator to pivotally raise or lower the ramp. Thus, the operator can often maneuver the ramp so as to catch a leading edge of the strip. Alternatively, the leading edge can be fed by hand onto the bottom edge of the ramp. Either way, only a relatively short leading edge of the strip needs to be located on the forward edge of the ramp to initiate removal of the strip. An operator standing on the second, or removal end of the vehicle can easily see the front end of the ramp.

Preferably, the ramp includes a forward plate, a belt-type conveyer residing rearward of the plate, and a drive roller which bears against a top surface of the strip as it moves up from the plate to the conveyor. Essentially, the ramp acts as an input section of the extractor.

With a first preferred embodiment, the ramp includes an upper pinch roller to aid in directing the strip to the infill removal section. The ramp may also include a lower pinch roller, which may be actively driven, or simply a passive rotating device. The infill removal section includes a housing with one or more agitators, or beaters, which contact the strip to remove infill therefrom as the strip moves therethrough. A downstream roller, located in the housing and downstream of the at least one or more agitators, engages and pulls the strip through the infill removal section, and preferably operates at a speed greater than the ramp roller. This helps to keep tension on the strip. When the trailing edge of the strip reaches the top roller of the ramp, it may be desirable to reverse the rotation of the conveyor pinch roller, thereby to restrain the trailing edge from being pulled prematurely into the infill removal section.

According to an additional embodiment, the use of an undulating path for the strip to traverse through the housing of the extractor/collector causes the strip to open up, to close up, and then to reopen. This promotes effective removal of the infill. More specifically, according to this embodiment, the ramp does not need a pinch roller, either at the top or bottom. Rather, the housing includes a plurality of pacing rollers, with spaced engagement teeth, that rotate to pull the strip along the path and toward the agitators located downstream thereof. These pacing rollers control the speed of the strip, and help to restrain the trailing edge thereof.

These pacers also invert the strip and direct it forward and toward the first agitator, or rotatable beater, which acts on the strip while in an open condition, then to a tension roller, which closes the strip, and then to a second agitator which again acts on the strip in an open condition. Again, this undulating open/close/open path promotes effective removal of the infill, and collection in the bottom of the infill removal section where it is augered to a conveyor.

Because the infill conveyor resides on one side of the vehicle, an operator of the vehicle can easily see the infill as it is conveyed rearwardly from the extractor/collector to the trailer. Also, the trailer is offset from the aft end of the vehicle, which also enables the operator to see the infill falling from the conveyor into the bag, or even when the bag is getting too full.

The second end of the conveyor includes a downward deflector, to deflect the conveyed infill downward to the bag. This minimizes problems that could otherwise be caused by wind. Also, if desired, the conveyor itself could be covered with a hood, with some or all of the hood being transparent.

The use of the conveyor and trailer eliminates the need to drive another motorized vehicle onto the surface in order to collect the extracted infill. The trailer and its accompanying bracket are sized to accommodate the upwardly and rearwardly extending conveyor. This structure causes the extracted and collected infill to be easily and continuously collected in the bags. Preferably, the trailer includes a push mechanism that moves the filled bag from the trailer, and onto the unfilled turf residing behind the trailer. These bags have upper ends that can be moved by a fork lift. Preferably, the wheels of the trailer are large flotation type, to better distribute the weight of the trailer, particularly with the bag therein.

The apparatus and methods described herein eliminate the need for large or heavy construction or truck-based equipment, or complicated machinery. Nonetheless, these attachments are sturdy and suitable for rigorous and continuous use, in a user-friendly manner. Also, the attachments are fairly easy to transport and store during periods of non-use.

These and other features of the present invention will be readily understood by a person skilled in the art, by reference to the following Figures which show several preferred embodiments of the invention, and the following detailed description which describes those preferred embodiments.

DETAILED DESCRIPTION OF THE PREFERRED EMBODIMENTS

FIG. 3A is a schematic elevation view showing the vehicle/turf cutting attachment arrangement of FIG. 1A adjacent a field of synthetic turf.

Figure 7:
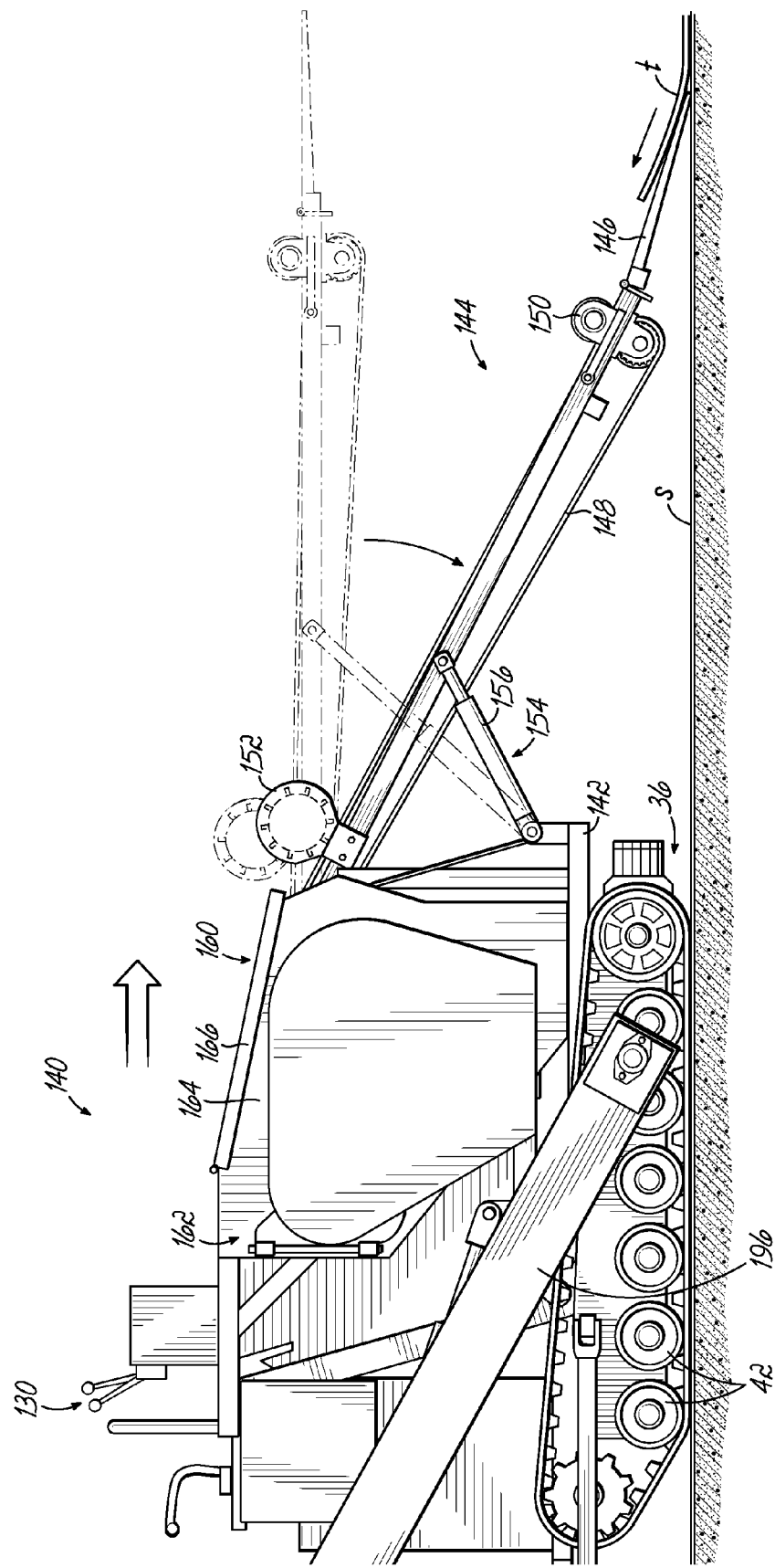
FIG. 7 is a schematic elevation view of the same vehicle and infill extraction and collection device of FIG. 6, with the device having a forward insertion plate inserted underneath a portion of synthetic turf to be lifted for infill extraction and collection.
Figure 7C:
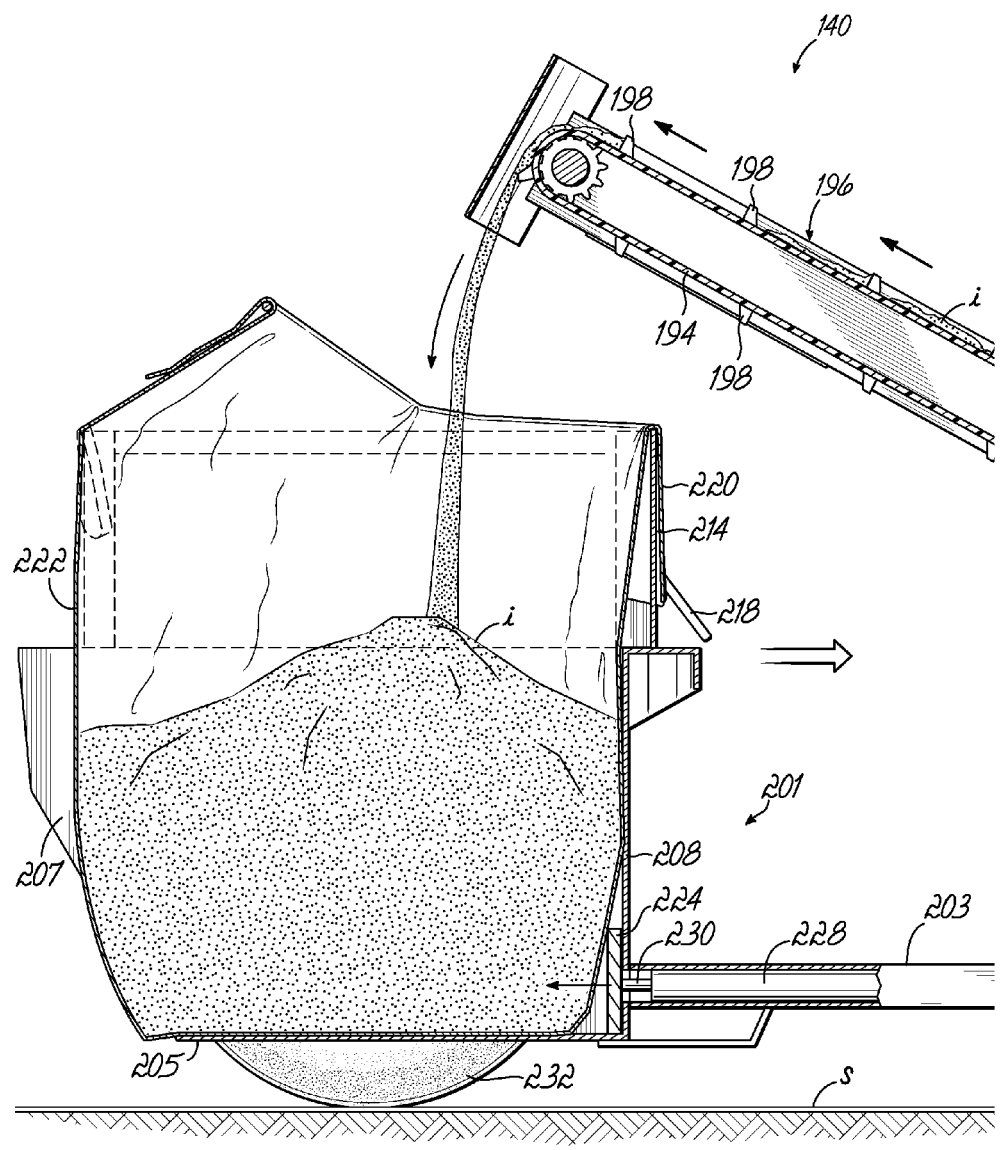
FIG. 7C is a schematic sectional view which shows the rearward components of the structure shown in FIG. 7, with the extracted infill being delivered from the collection bin to a collection trailer, according to one preferred embodiment of the invention.
Figure 7D:
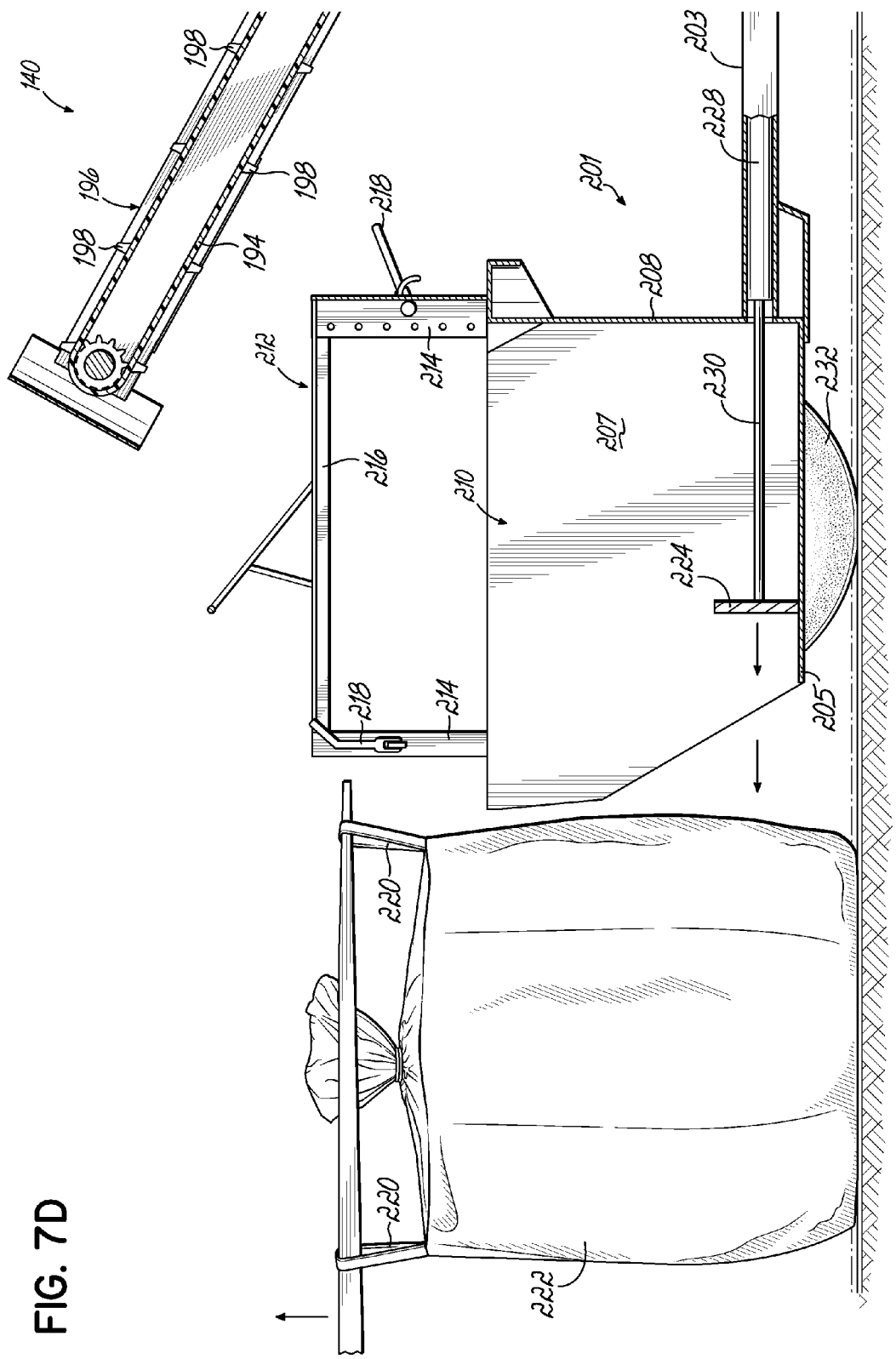
FIG. 7D is a schematic elevation view showing a bag of infill that has been removed from the collection trailer shown in FIG. 7C.
Figure 7E:
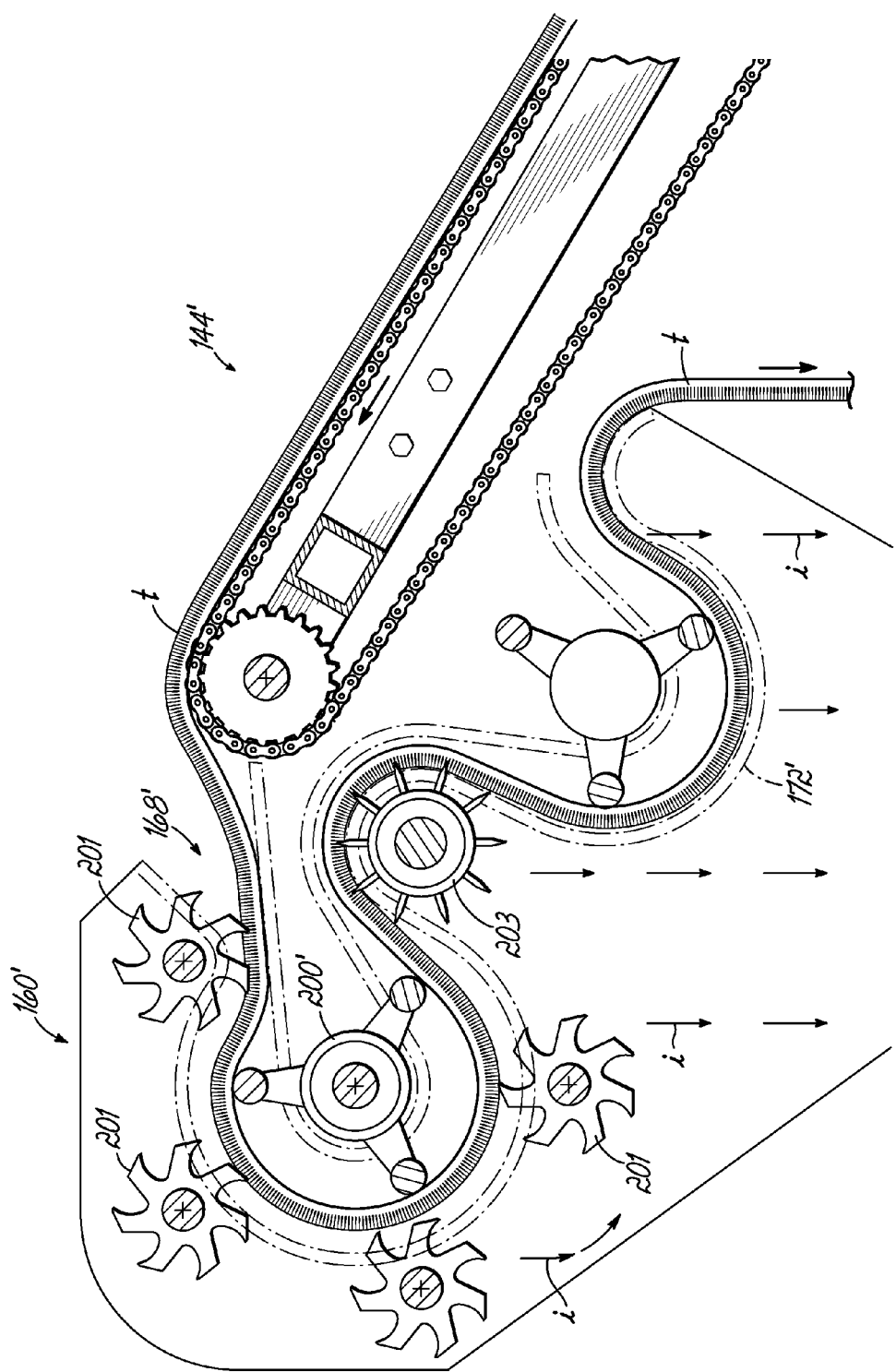
FIG. 7A is a schematic sectional view which shows the internal features of the infill extraction and collection device of FIGS. 6 and 7, including the conveyor belt, the driven nipped rollers, the at least one agitator, and the auger.
FIG. 7B is a schematic sectional view which shows a strip of synthetic turf as it travels through the housing of the infill extraction and collection device of FIGS. 6, 7, and 7A, as the infill is removed therefrom and collected in the collection bin.

FIG. 7E schematically shows the structure of an alternative infill extraction and collection device, according to another alternative embodiment of the invention.

Figure 8A:
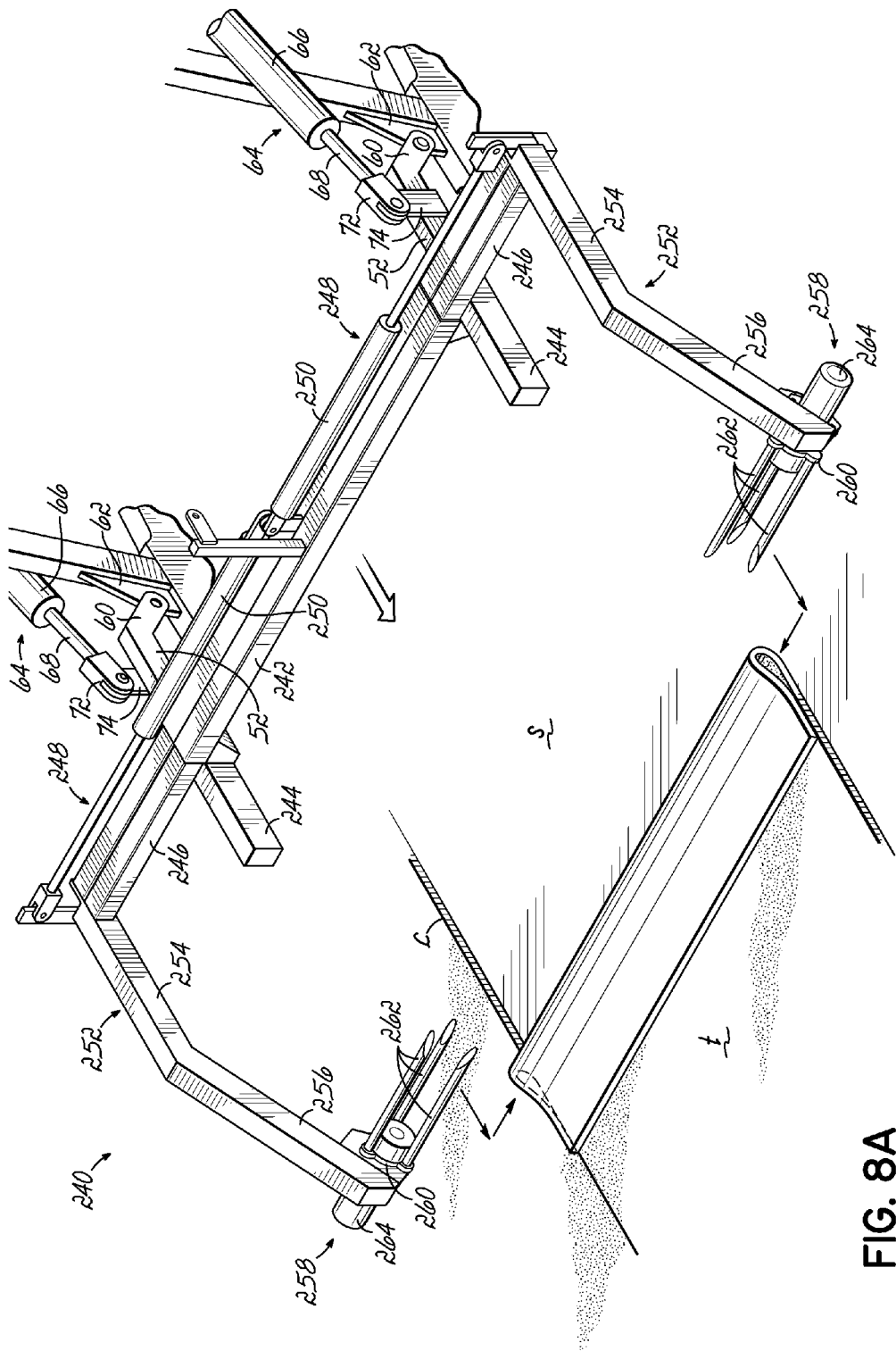

FIG. 8A is an isometric view of a turf wind up device constructed according to a first preferred embodiment of the invention, the turf wind up device being suitable for rolling up, or winding up, a strip of synthetic turf.

Figure 8B:
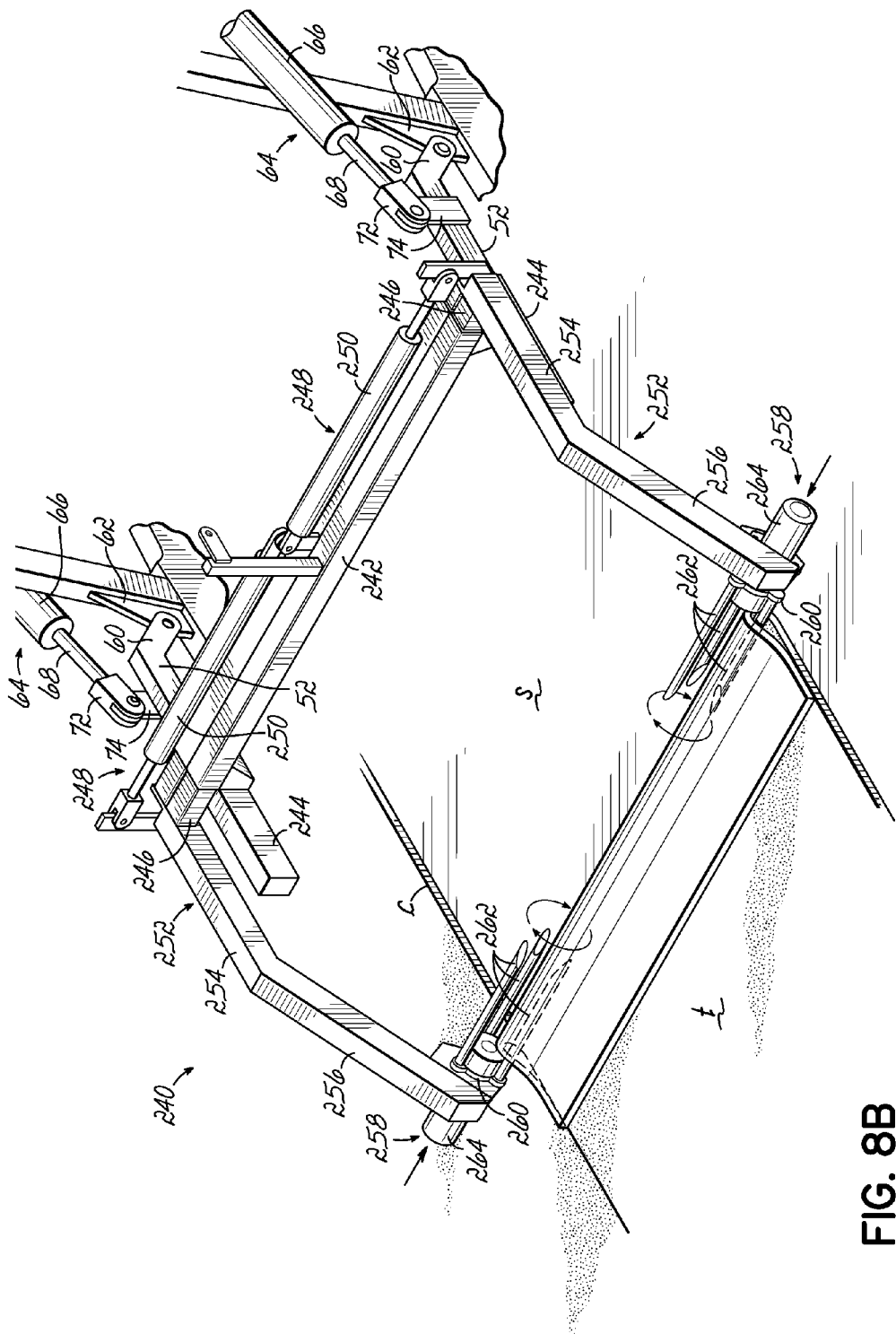

FIG. 8B is a schematic isometric view of the turf rolling device of FIG. 8A, as it begins to roll up a strip of synthetic turf.

Figure 8C:
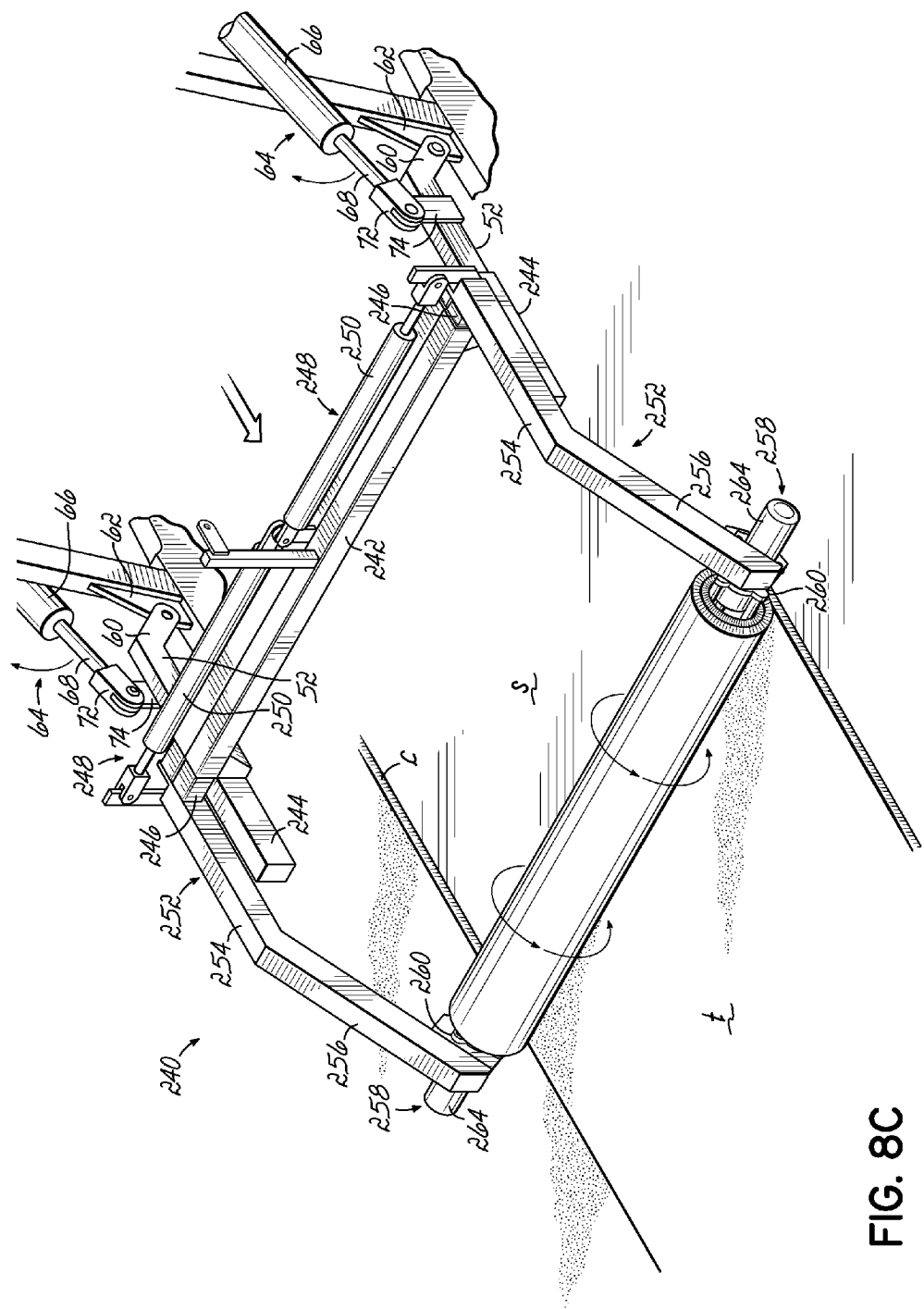

FIG. 8C is a view similar to that of FIG. 8B, showing the turf rolling device as it further rolls up the strip of synthetic turf.

Figure 9A:
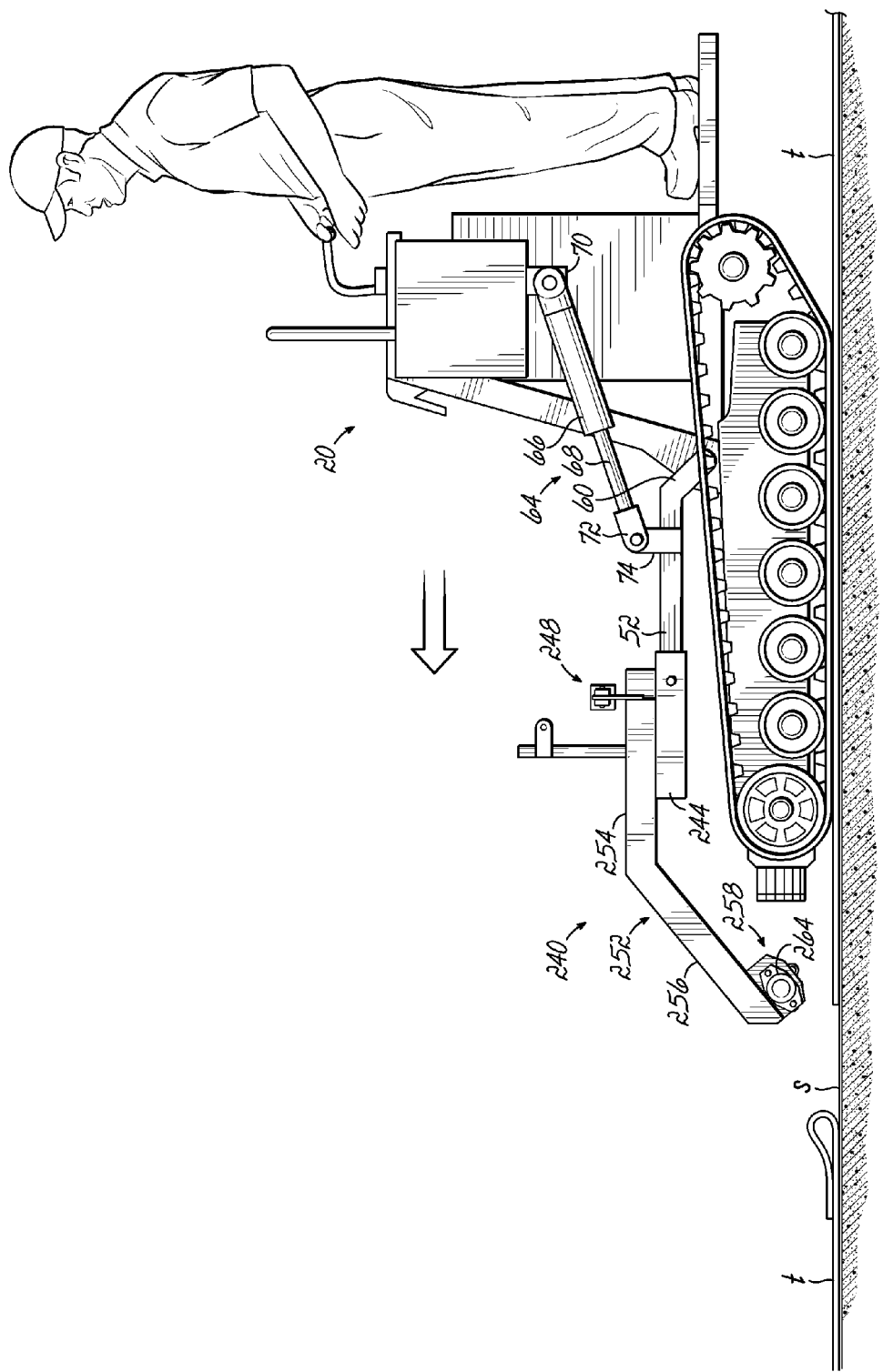

FIG. 9A is a schematic elevation view of the turf rolling device of FIGS. 8A, 8B, and 8C, in combination with a vehicle, according to one aspect of the invention, with the vehicle positioned adjacent a strip of synthetic turf to be wound up.

Figure 9B:
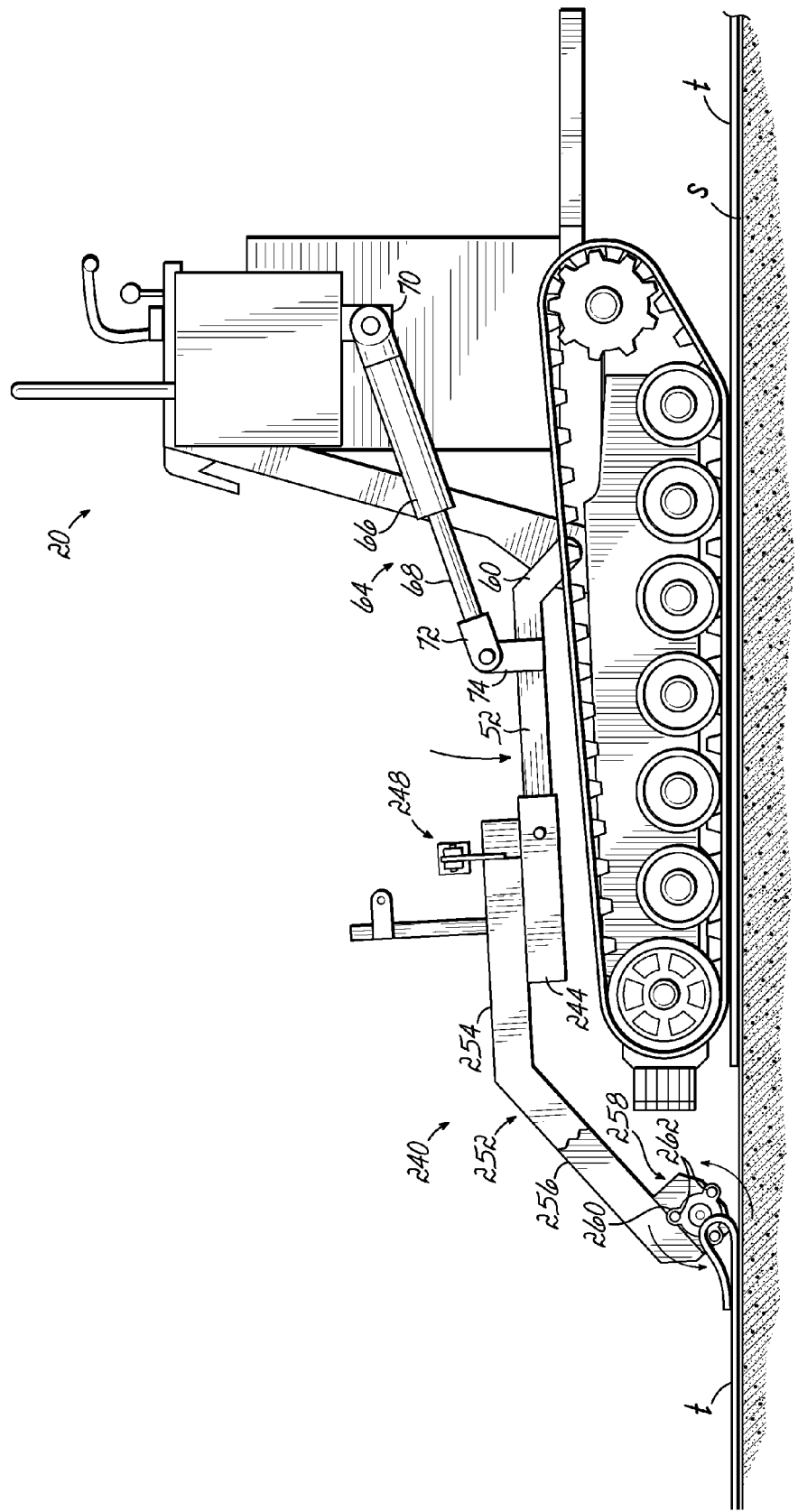

FIG. 9B is a view similar to FIG. 9A, showing the vehicle and the turf rolling device as the device begins to roll up the synthetic turf.

Figure 9C:
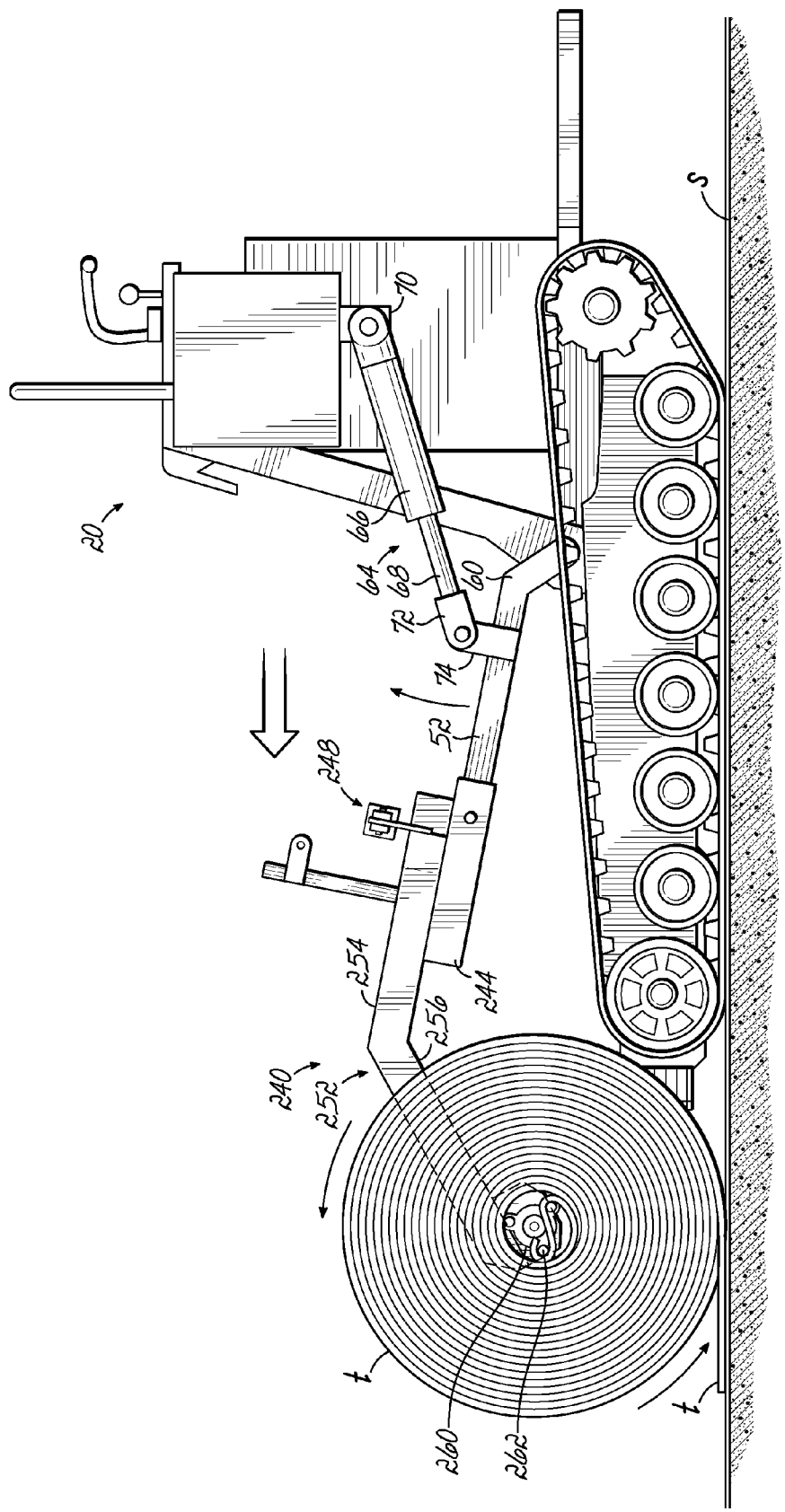

FIG. 9C is a view similar to FIGS. 9A and 9B, showing the strip of synthetic turf nearly completely rolled up by the turf rolling device.

Figure 10:
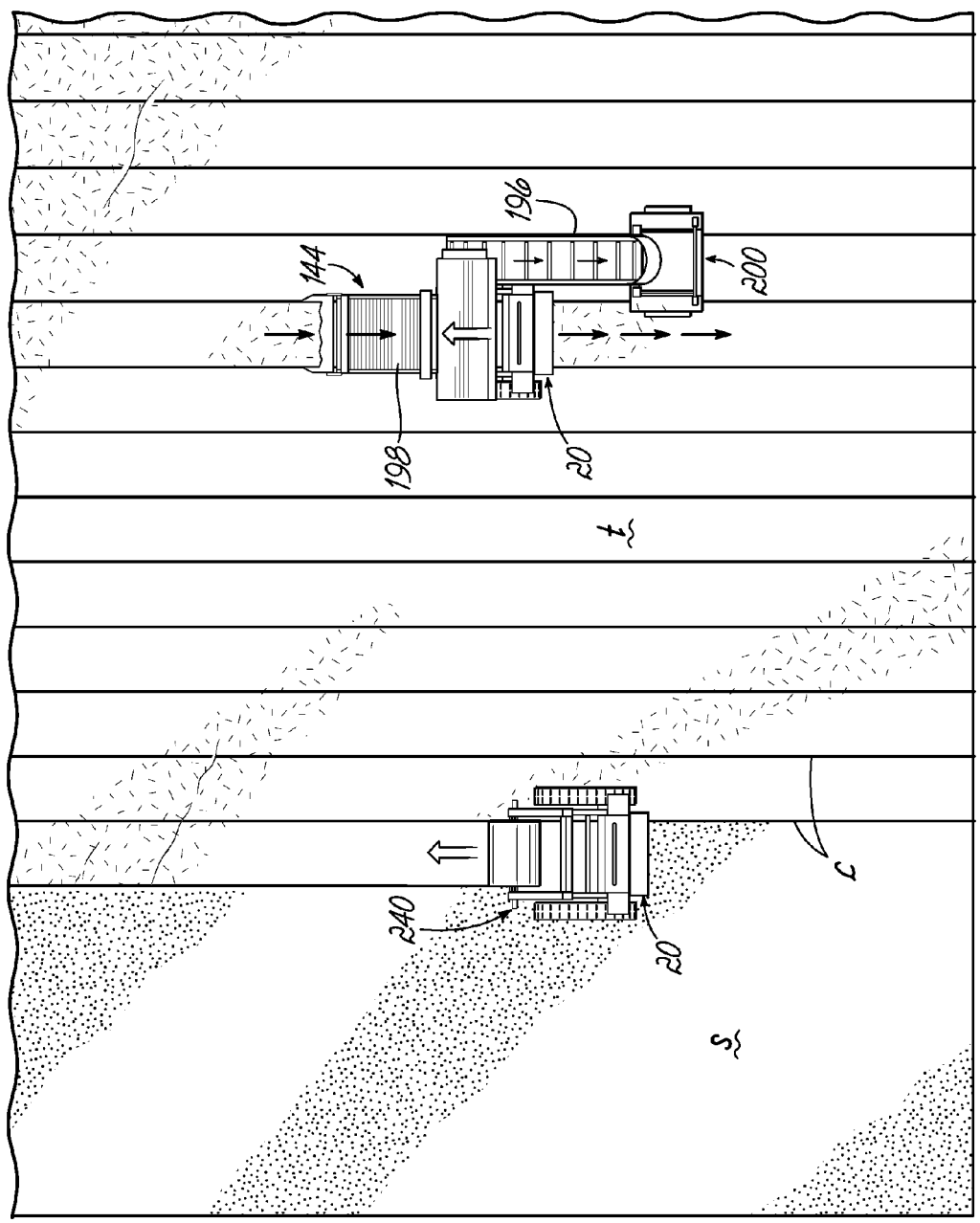

FIG. 10 is a plan view showing two moving vehicles, with one moving vehicle operatively connected to a turf wind up device as the device winds up a strip of synthetic turf (left side), and a second moving vehicle operatively connected to an infill extraction and collection device as the device extracts and collects infill from the synthetic turf (right side).

DETAILED DESCRIPTION OF THE PREFERRED EMBODIMENTS

In addition to the application referenced above, applicants expressly incorporate herein, by reference, in its entirety, U.S. Pat. No. 5,307,880, entitled "Sod Rollout Machine With Endless Tracks."

The present invention relates to devices and methods pertaining to the installation and removal of synthetic turf from a field, and to removing infill from the synthetic turf. In particular, a vehicle and several attachment devices are provided that are useful for performing steps relating to the installation and removal of synthetic turf, and to removing infill from the synthetic turf. The attachment devices are useful for cutting a synthetic turf field into strips, removing infill from the synthetic turf and collecting the infill, removing the synthetic turf from the field, and for installing new synthetic turf onto the field. The device used for the purpose of removing the infill, i.e., extracting and collecting the infill, connects to both the front (or leading end) of the vehicle and the rear (or trailing end) of the vehicle. As shown in the Figures, synthetic turf is generally indicated by the letter t, infill by the letter i, and the subsurface below the synthetic turf by the letter s. These letter designations are not used throughout this textual description, however, to avoid the excessive repetition that would be created if they were so used.

Figure 1:
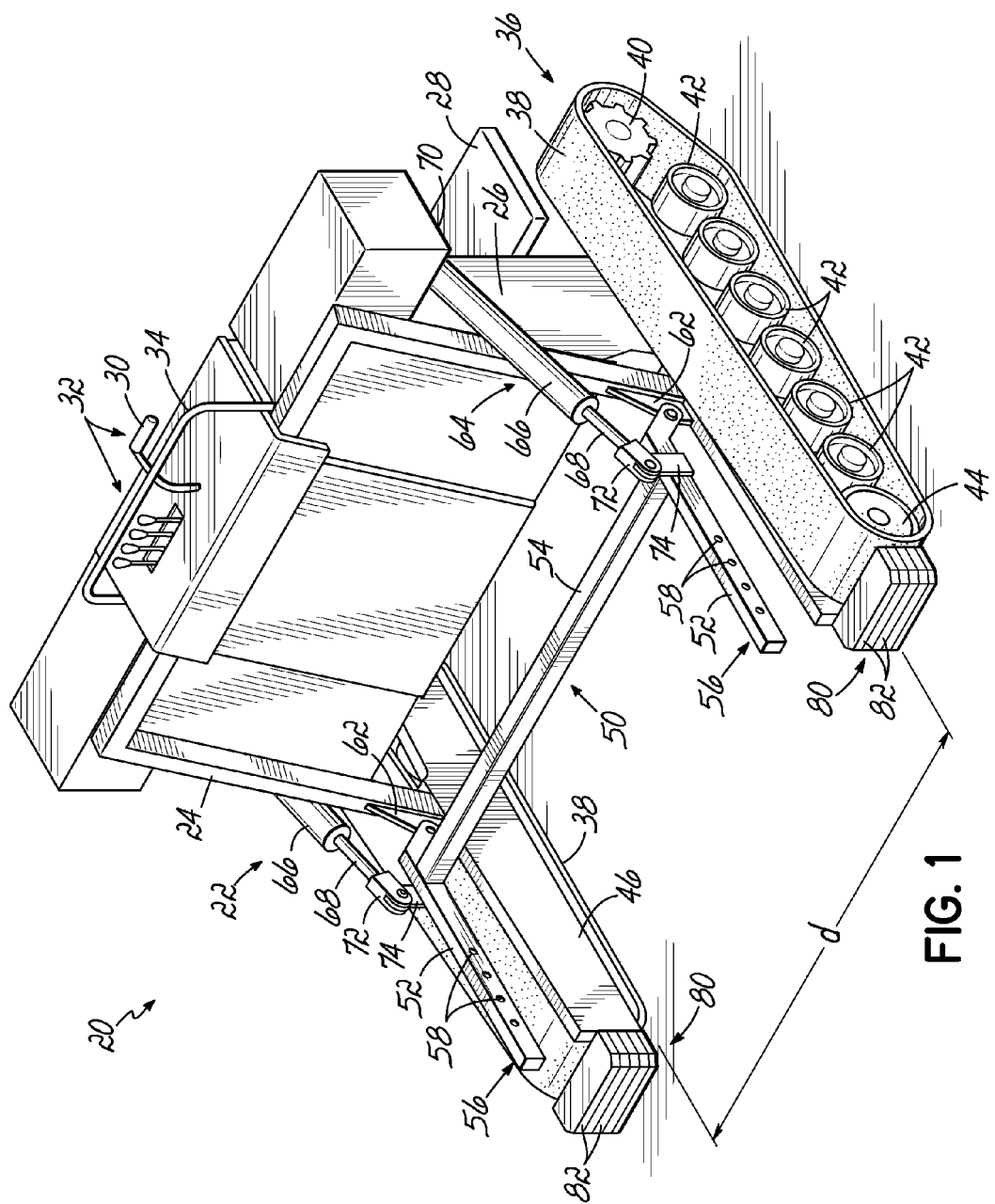
FIG. 1 is an isometric view showing a first preferred embodiment of a vehicle that may be used in conjunction with one or more devices, to cut a synthetic turf field into strips, to separate infill from the strips of synthetic turf for collection, to remove the strips of synthetic turf from the field by winding, and to install new synthetic turf.
Figure 1A:
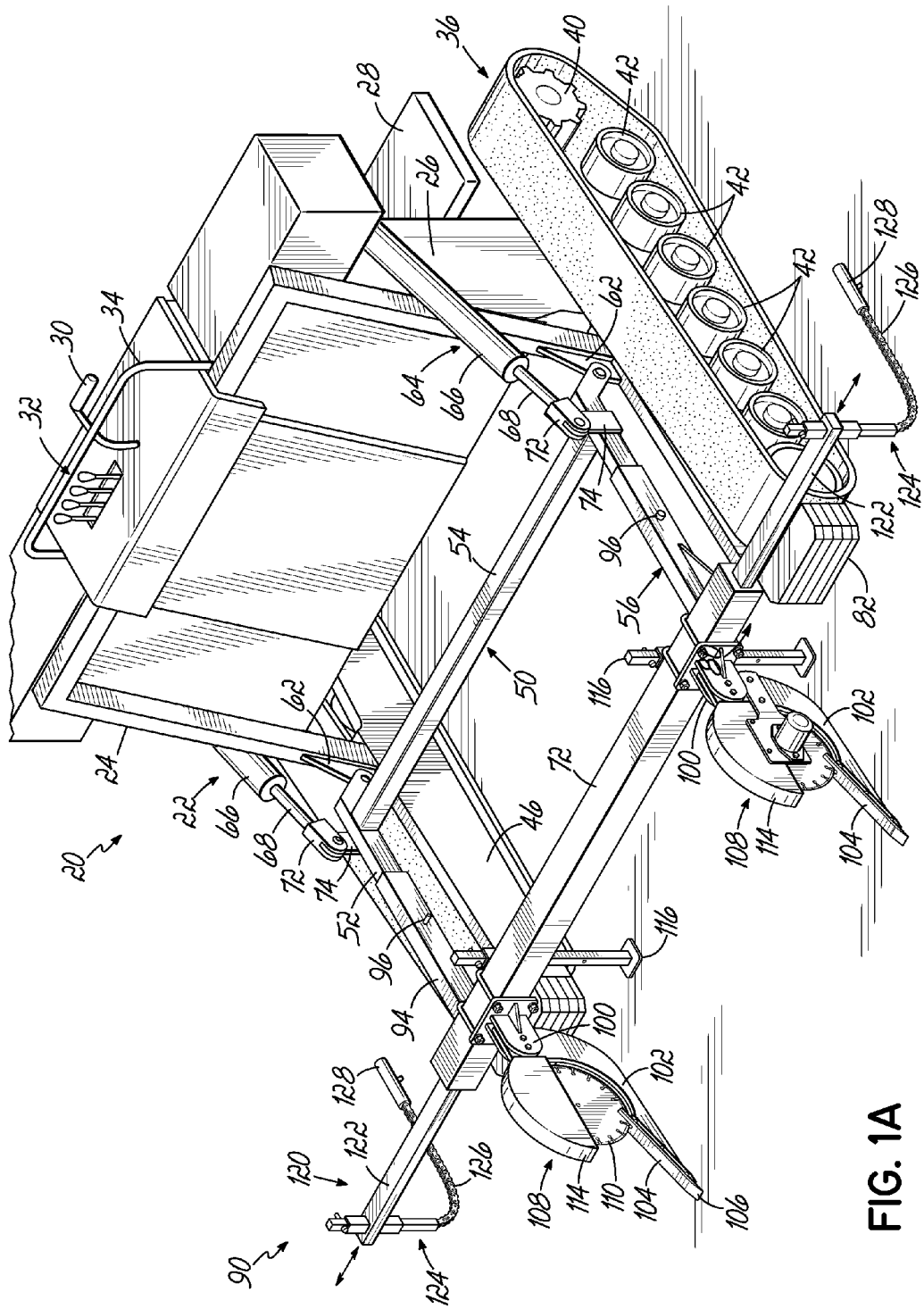
FIG. 1A is an isometric view showing the vehicle of FIG. 1 with a turf cutting device, or attachment, constructed according to a first preferred embodiment of the invention connected thereto, the turf cutting attachment including turf cutters for cutting a strip of synthetic turf.
Figure 2:
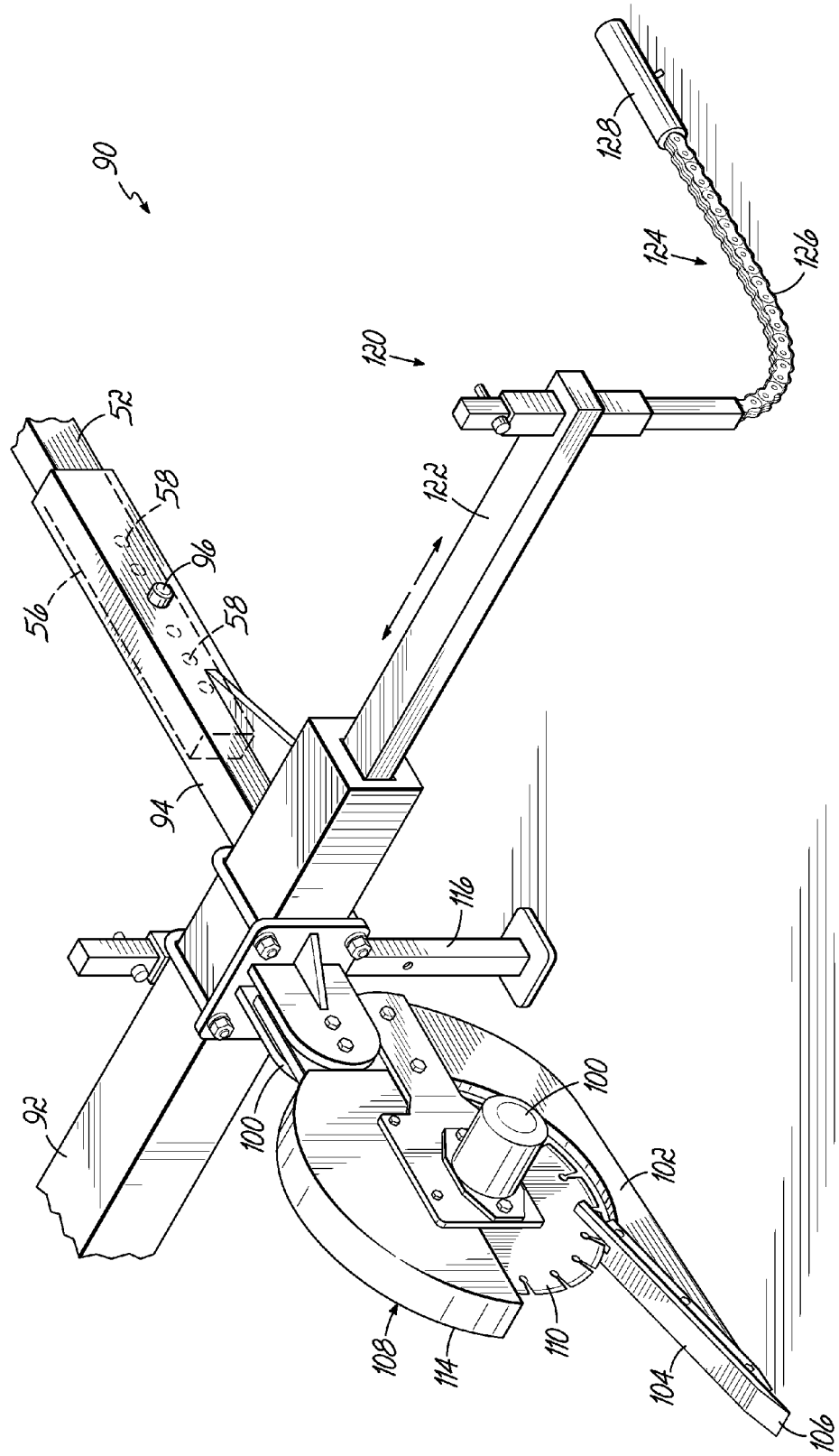
FIG. 2 is an isometric view showing one side of the turf cutting attachment shown in FIG. 1A, including the position marking assembly.
Figure 3B:
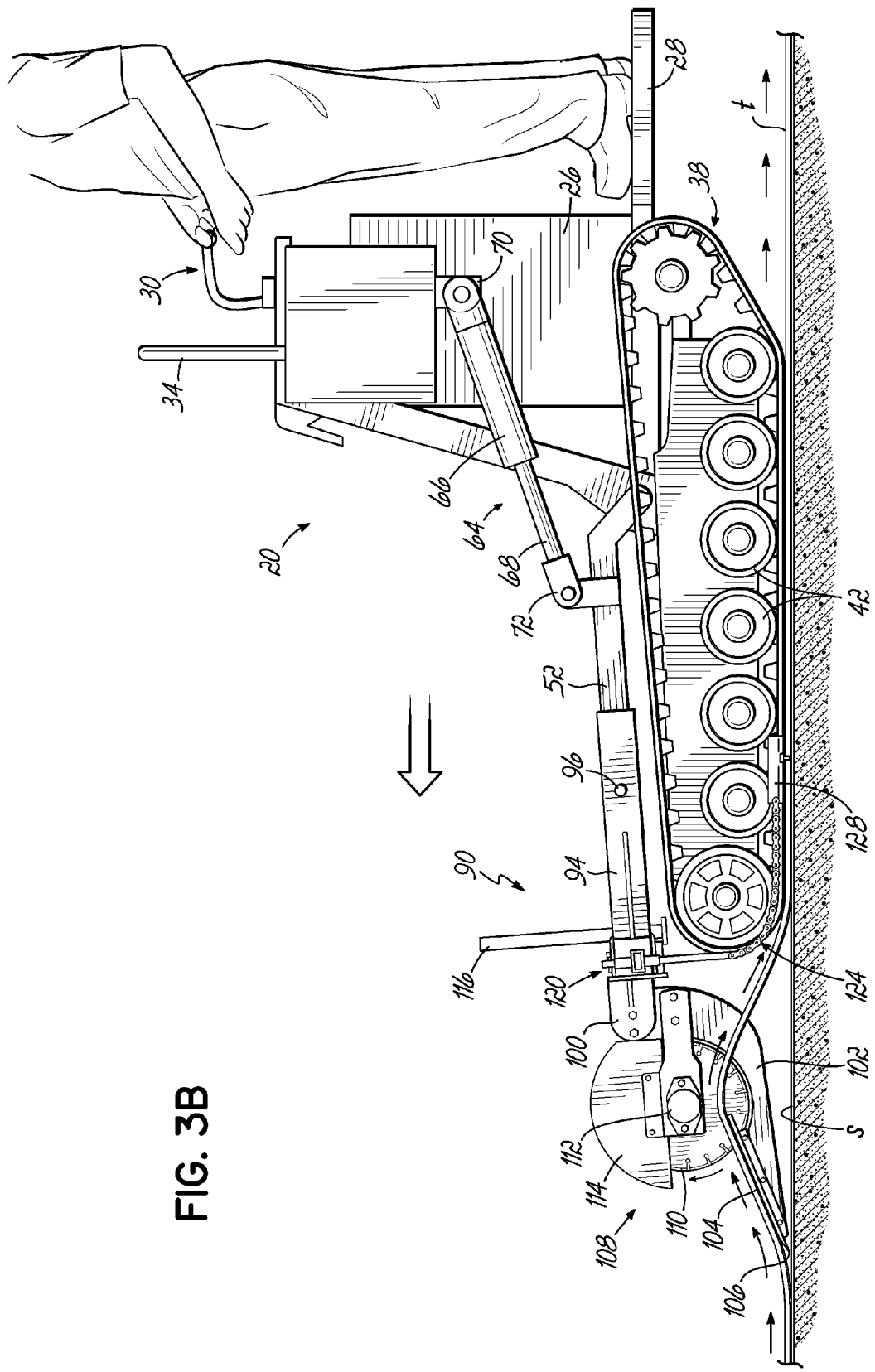
FIG. 3B is a schematic elevation view showing the vehicle/turf cutting attachment arrangement of FIGS. 1A and 3A, the turf being guided toward and cut by a turf cutter.

Referring first to FIG. 1, according to a first preferred embodiment a vehicle for use with the various attachment devices disclosed herein is shown and is indicated generally by the numeral 20. The vehicle 20 includes a chassis 22 to which all its other components are connected, either directly or indirectly. An upper frame 24 is provided forward of the vehicle's power-generating components, which are concealed beneath a housing 26. For example, the vehicle 20 would include a motor, a hydraulic pump system, and transmission components, even though these components are not shown specifically in the Figures. A platform 28 is provided rearward of the frame 24 and the housing 26, and a user can stand on the platform 28 to ride with the vehicle 20. A control console 30 is provided with controllers 32 for controlling or operating the vehicle 20. A handlebar 34 is provided near the control console 30 for a user to grab, such as for support while stepping onto the platform 28.

The vehicle 20 includes endless drive track assemblies 36 having endless loop tracks or treads 38, which are also referred to as treads. A drive sprocket 40 transfers rotational power to the tracks 38, which rotate around a series of intermediate rollers 42 and front rollers 44. The rollers 42, 44 are connected to roller plates 46, which are attached to the chassis 22. The tracks 38 are separated by a space, or distance d. By using tracks, the vehicle 20 applies less weight per unit area to whatever is beneath it, compared to the weight that would otherwise be applied if conventional wheels and tires were used to support the vehicle. The use of such tracks is advantageous in the context of a synthetic turf field, because such tracks minimize disruption to the subsurface beneath the synthetic turf.

The vehicle 20 includes an attachment lift assembly 50 for causing movement of an attachment device, as will become apparent. The attachment lift assembly 50 includes two generally parallel and forwardly-extending arms 52 connected by a transverse brace 54, which together form a support. The arms 52 include an attachment portion 56 at a forward end thereof and have a plurality of locking pin holes 58. The arms 52 also include an angled pivot portion 60 at a rearward end thereof. The arms 52 are pivotally connected to the upper frame 24 through pivot brackets 62, which are positioned near the intersection of the upper frame 24 and the roller plates 46. The attachment lift assembly 50 further comprises movement actuators 64 for causing movement of each arm 52. Each movement actuator 64 includes a cylinder 66 having a hydraulically driven piston 68. The cylinder 66 is connected at a base end 70 to the vehicle 20 near the housing 26, and at a terminal end 72 to a movement actuator bracket 74. The movement actuator bracket 74 is connected to, or may be integral with, the arm 52. It will be appreciated that extension of the piston 68 from the cylinder 66 moves the arms 52 in a generally downward direction, whereas contraction of the piston 68 moves the arms 52 in a generally upward direction.

Of course, alternative arrangements for providing an attachment lift assembly are also contemplated, such as where the arms 52 are connected to the roller plates 46, where the cylinders 66 are connected to the roller plates 46, and others. The vehicle 20 also includes a counterweight assembly 80 positioned near the forward end of the endless tracks 38. The counterweight assembly 80 includes a plurality of weight plates 82, the number of which may be selectively adjusted so that a desired weight balance of the vehicle 20 is achieved, which can be influenced by the weight of the user standing on the platform 28, the weight of the attachment device connected to the vehicle 20, and other factors.

Referring next to FIGS. 1A, 2, 3A, and 3B, 4, and 5, a turf cutting attachment 90 is show that can be connected to the vehicle 20. The turf cutting attachment 90 is used to cut a synthetic turf field into strips, which strips are subsequently handled as disclosed herein. In particular, the turf cutting attachment 90 includes a widthwise-extending frame 92 having rearwardly extending attachment arms 94 that are configured to mate with the attachment portions 56 of the arms 52 of the vehicle 20. Each attachment arm 94 includes a locking pin hole 96 configured to receive a locking pin, such as to lock the arms 52 with respect to the arms 94. Two turf guide and cutting assemblies 98 are mounted on the frame 92 by a mounting bracket 100. A turf guide 102 extends from each bracket 100 toward the front end of the turf cutting attachment 90, and includes an angled feed ramp 104 having a distally located tip 106. A turf cutter 108 is connected to the bracket 100, and in the embodiment shown includes a circular blade 110 that is driven by a motor 112 and is partially covered by a shroud 114. The motor 112 is operatively connected to a power source maintained by the vehicle 20, such as a supply of hydraulic fluid, for example. As the vehicle 20 moves in the forward direction, the angled feed ramp 104 guides the synthetic turf toward the turf cutter 108, and the blade 110 cuts the turf. In other embodiments, other cutting devices can be used, such as band saws, heat cutting tools, air cutting tools, shears, and the like. It will be appreciated that the distance between the turf cutter 108 is chosen to cut an appropriately-sized strip of synthetic turf. Particularly, the distance between the turf cutting devices 108 is chosen so as to cut strips of synthetic turf that are slightly narrower than the distance d between the tracks 38 of the vehicle 20.

Jack stands 116 can be included with the turf cutting attachment 90 to support the weight thereof, and to prevent excessive weight from being supported by the turf guides 102, such as near the tips 106. The jack stands 116 can move up and down with respect to the frame 92, or could also rotate with respect thereto.

The turf cutting attachment 90 also includes position marking assemblies 120 for making a guide mark on a synthetic turf field corresponding to a desired cut line. The position marking assemblies are positioned generally at opposed ends of the frame 92, and each includes a position adjustable arm 122 extending from the frame 92. A position marker 124 depends downwardly from the position adjustable arm 122, and includes a chain portion 126 and a spiked weight 128 at the distal end thereof. The spiked weight 128, when dragged across a field of synthetic turf, disturbs the turf in a manner that creates a visually perceptible line. The position of the position marker 124 with respect to the frame 92 may be chosen (by adjusting the position of each arm 122) so that the line created by the position marker 124 corresponds to a position for the user to make a cut in the synthetic turf using the turf cutting attachment 90, such as the next cut in the synthetic turf when the user is following a back-and-forth route across a field (in the familiar way that a lawn is mowed, for example).

Figure 4:
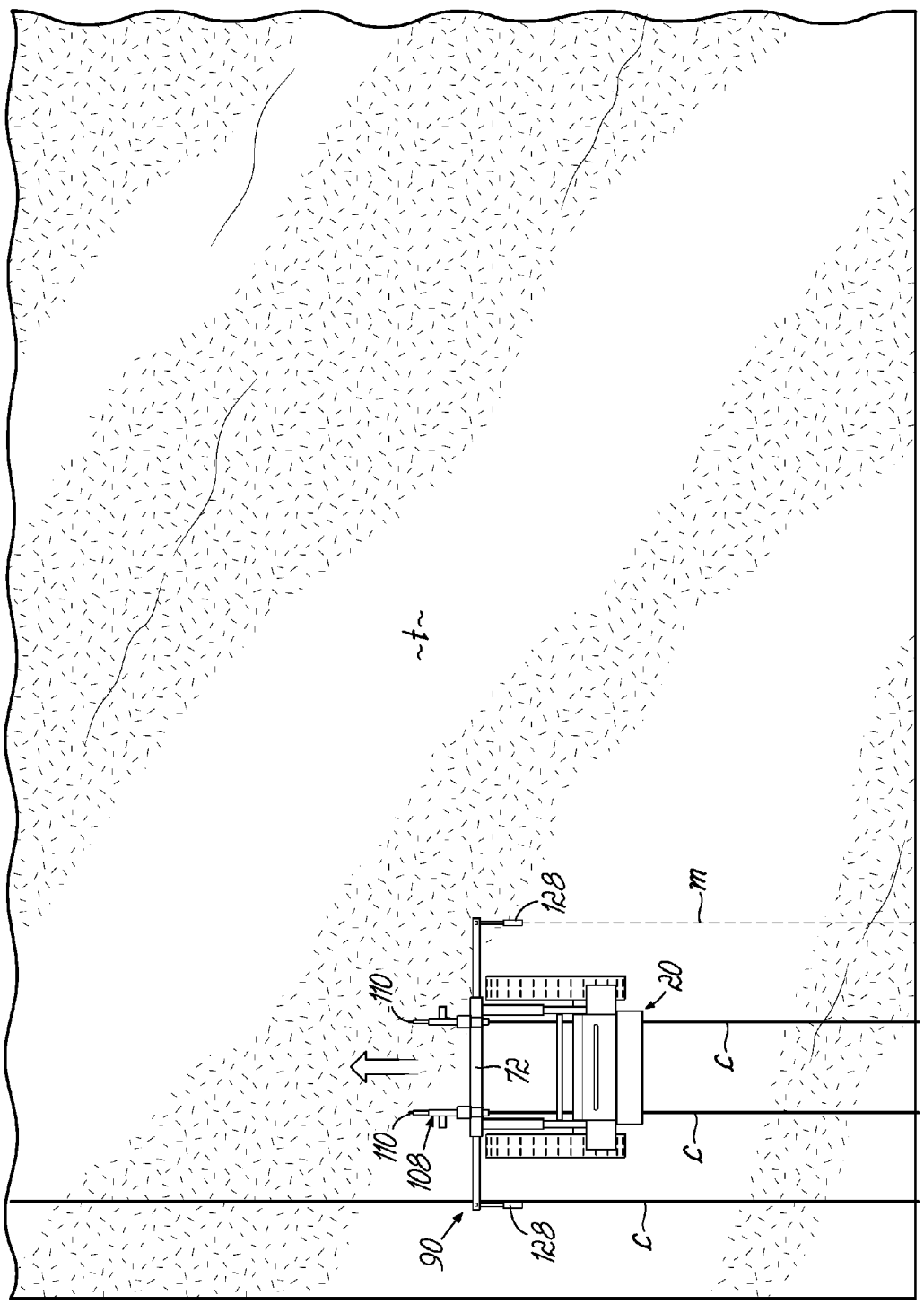
FIG. 4 is a plan view showing a synthetic turf field being cut by the vehicle/turf cutting attachment arrangement of FIG. 1A.

As shown in FIG. 4, as the vehicle 20 having the turf cutting attachment 90 makes its way across the field of synthetic turf, the turf is cut into strips (cut turf lines indicated by the letter c), and marked with the position for the next cut line (marked turf line indicated by the letter m). And as shown in FIG. 5, in addition to cutting the synthetic turf into strips, the vehicle 20 can be used in with an infill extraction and collection attachment 140.

Figure 5:
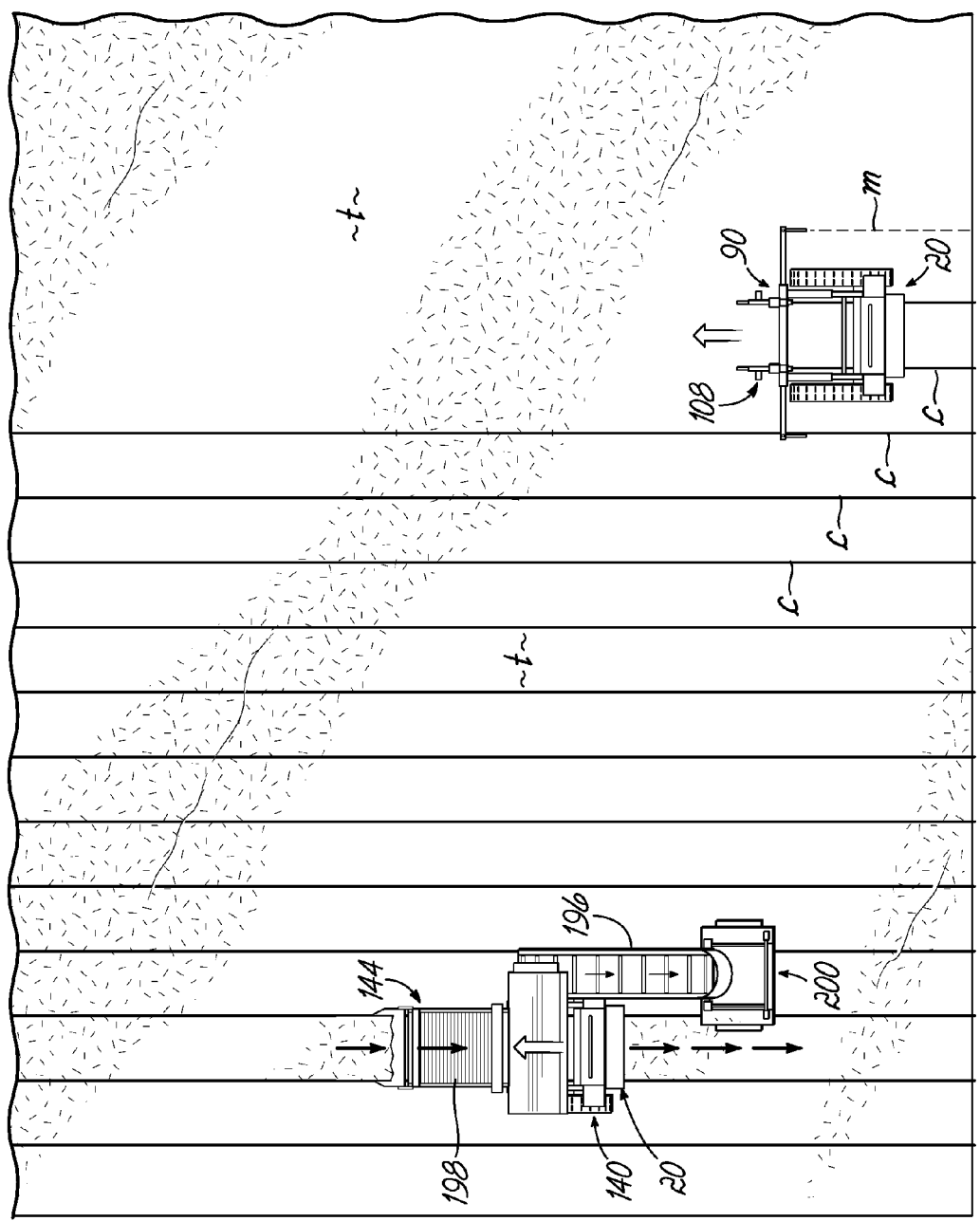
FIG. 5 is a plan view that shows a synthetic turf field as it is cut by the vehicle mounted turf cutting attachment shown in FIG. 1A (right side), and which also shows, concurrent therewith, infill being removed from another strip of the synthetic turf by a separate vehicle equipped with an infill extractor/collector device (left side).
Figure 6:
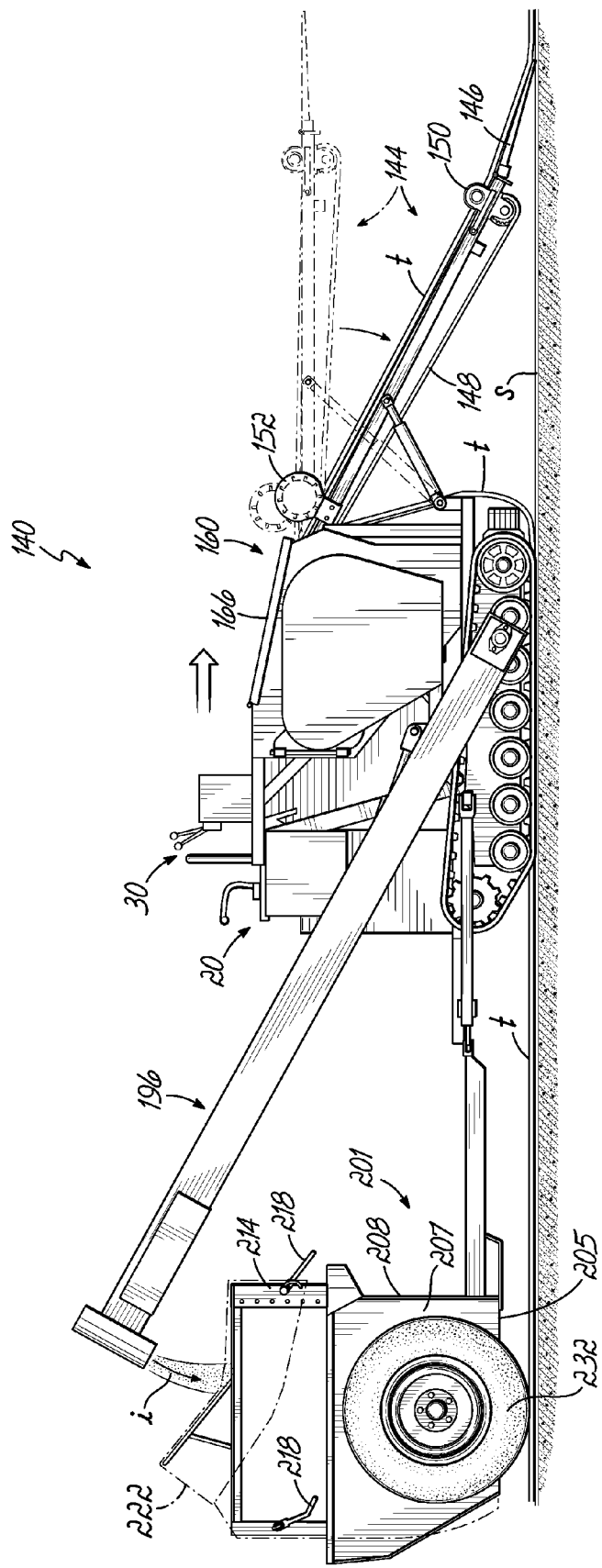
FIG. 6 is a schematic elevation view showing the vehicle of FIG. 1 with, connected thereto, an infill extraction and collection device constructed according to a first preferred embodiment of the invention, for removing infill from the synthetic turf.

Referring next to FIGS. 5, 6, 7, and 7A-7E, an infill extraction and collection attachment 140 is shown that can be connected to the vehicle 20. The infill extraction and collection attachment 140 is used to separate infill from synthetic turf, and to collect the infill. In particular, and as shown in FIG. 5, once a field of synthetic turf is cut into strips, the strips are processed by the infill extraction and collection attachment 140.

The infill extraction and collection attachment 140 includes a frame 142 to which its various components are attached. At the forward end thereof, the infill extraction and collection attachment 140 includes a turf conveyor assembly 144. A hinged insertion plate 146 is at the leading edge thereof, and is for insertion under a portion of synthetic turf. The turf conveyor assembly 144 includes a driven endless conveyor belt 148 for moving and supporting synthetic turf as it moves upwardly at an angle thereon.

The turf conveyor assembly 144 includes a heavy roller 150 near its forward end (near the hinged insertion plate 146). The heavy roller 150 helps to encourage traction between the synthetic turf and the endless conveyor belt 148. The heavy roller 150 is passive, and not driven by a motor, though it could be. The turf conveyor assembly also includes a first nipped roller 152 near an upper end thereof and generally away from the heavy roller 150. The first nipped roller 152 is driven by a motor and positively engages the synthetic turf and feeds it into an extraction and collection assembly 160, which may also be referred to as an extractor/collector, as it includes an infill removal section. Further, the first nipped roller 152 generally discourages the synthetic turf from entering the extraction and collection assembly 160 faster than rotation of the first nipped roller 152 will allow.

A turf conveyor assembly movement actuator 154 is provided for pivotably raising and lowering the turf conveyor assembly 144 (with a raised position being shown in dashed lines in FIGS. 6 and 7, for example), and may include a hydraulic cylinder system 156 connected to the frame 142 that operates according to well known principles.

The extraction and collection assembly 160 includes a housing 162 that includes side panels 164 and a lid 166. An entry 168 and exit 170 are defined in forward upper and lower portions of the housing 162, respectively. The entry 168 may generally be considered an input section and the exit 170 may generally be considered an output section. Synthetic turf being processed by the extraction and collection assembly 160 enters the housing at the entry 168 and exits the housing 162 at the exit 170. Thus, synthetic turf enters and exits the extraction and collection assembly 160 on the same generally forward side. A guide rail 172 is disposed within the housing 162 that defines and limits the movement of synthetic turf therein. In particular, the guide rail 172 includes a generally flat upper portion 174 connected with a generally flat lower portion 176, with the portions 174, 176 being connected near a rearward end of the housing 162 by a curved transition portion 178. A second nipped roller 180 is positioned with the housing 162 near the exit 170 and is used to urge synthetic turf out of the housing 162. When turf exits the housing 162, it falls under its own weight toward the ground and is guided by an external guide 182 away from the housing 162. Particularly, the external guide 182 can include a generally cage-like structure that guides the turf away from the infill extraction and collection attachment 140 and back toward the ground.

The housing 162 also includes a collection bin 184 for collecting infill that is removed from the synthetic turf, the collection bin having angled walls 186 leading to a trough 188. The trough 188 includes an opening 190 for removal of the infill therefrom by an auger 192, as will be explained more fully below. The collection bin 184 can also be referred to generally as an infill collector section.

A plurality of infill extractors 200 are provided within the housing 162. The infill extractors 200 act on the synthetic turf to essentially agitate or beat the synthetic turf so that the infill becomes separated from the turf. Hence the infill extractors can also be referred to as agitators. The infill then falls within the housing 162 into the collection bin 184. In particular, each infill extractor 200 includes a central shaft 202, a plurality of arms 204 extending from the central shaft 202, and a distal shaft 206 associated with each arm 204 and being positioned away from the central shaft 202, giving each infill extractor an overall triangular cross-sectional shape. While three arms 204 and three distal shafts 206 are shown, other numbers thereof are also contemplated, such as infill extractors having two arms and two distal shafts. The extractors 200 are rotated about their central shafts 202, and the distal shafts 206 make contact with the synthetic turf. Thereby, infill is dislodged from the synthetic turf and falls in the housing 162 and eventually reaches the collection bin 184.

As synthetic turf enters the extraction and collection assembly housing 162 at the entry 168, it is directed rearwardly in a generally horizontal orientation. Movement thereof is limited and guided by the guide rail 172. The synthetic turf is moved rearwardly and around a rearmost infill extractor 200, which then feeds the synthetic turf horizontally in the opposite direction back toward the front of the housing 162, so to invert the synthetic turf. The infill extractors 200 can act to both pull the strip of synthetic turf into the extraction and collection assembly 160 and beat the turf so as to remove the infill therefrom. The infill extractors 200 are driven by one or more motors and can rotate in either rotational direction. For example, driving the infill extractors 200 in one direction tends to pull the synthetic turf into the extraction and collection assembly 160 and direct it toward the rearward portion thereof. As the synthetic turf reaches the rearward portion of the extraction and collection assembly 160 and is inverted, rotation of the infill extractors 200 in the same direction directs the synthetic turf toward the front of the extraction and collection assembly 160 and toward the exit 170. The second nipped roller 180 further directs the synthetic turf out of the housing 162 through the exit 170. Advantageously, the central shafts 202 of the infill extractors 200 may be inter-connected by a drive assembly 199 so that rotation of one central shaft 202 (a driven shaft) causes rotation of the other central shafts 202. The drive assembly 199 may include any appropriate linkages, and may be operatively connected to a power source maintained by the vehicle 20, as will be apparent to a skilled practitioner. Further, the rotation of the central shafts 202 shafts may be set to any appropriate timing. For example, the central shafts 202 may be driven at the same or different rotational rates. Advantageously, the rearward-most infill extractor 200 may be driven at a slower rotational rate than the more forward infill extractors 200 since the rearward-most infill extractor will be under a greater load by virtue of being in contact with a greater portion of the synthetic turf. Also, all three central shafts 202 may be driven at different rates. Moreover, the infill extractors 200 may be set to have any relative rotational position. For example, the rotational position of the triangular-shaped infill extractors 200 may be synchronized so similar respective arms 204 of the triangle shapes occupy the same rotational position. Alternatively, similar respective arms 204 of the triangle shapes may not occupy the same rotational position. Optionally, a cover plate 169 may be provided above the first encountered infill extractor, which is positioned nearest the entry 168 and exit 170.

Some of the infill loosens as the synthetic turf moves rearwardly toward the rear of the housing 162, while most of the infill falls out upon beating of the synthetic turf as it moves forwardly, in the inverted position. The infill removed from the synthetic turf in the extraction and collection assembly 160 is collected in the collection bin 184 near the bottom of the housing 162.

After being fed into the extraction and collection assembly 160, being inverted, and being beaten by the infill extractors 200, the turf is directed via the external guide 182 to a position under the infill extraction and collection attachment 140 and between the tracks 38 of the vehicle 20. Particularly, the second nipped roller 180 is positioned near the exit 170 of the extraction and collection assembly 160 and pulls the synthetic turf so as to direct it out of the extraction and collection assembly 160. The second nipped roller may be driven, with the rotational rate of the second nipped roller 180 being slightly greater than the rotational rate of the first nipped roller 152 so as to maintain a tension in the synthetic turf when it is in the extraction and collection assembly 160. Of course, the nipped rollers 152, 180 may be driven at any relative rate, including at the same rate. The nipped rollers 152, 180 may also be referred to as pinch rollers, or guide rollers.

Thus, the first nipped roller 152 directs synthetic turf into the extraction and collection assembly 160 and the second nipped roller 180 directs synthetic turf out of the extraction and collection assembly 160. As mentioned, the infill extractors 200 can rotate in a direction that encourages movement of the synthetic turf through the extraction and collection assembly 160 from the entry 168 to the exit 170. Advantageously, the rotational direction of the infill extractors 200 may be controlled by a user for the efficient movement of the synthetic turf through the extraction and collection assembly 160. For example, while the infill extractors 200 generally move in a direction that encourages the synthetic turf to move through the extraction and collection assembly 160 from the entry 168 to the exit 170, the direction of the infill extractors 200 may also be reversed. Since the second nipped roller 180 pulls the synthetic turf through the extraction and collection assembly 160 and pushes it out of the exit 170, the synthetic turf will continue to advance between the entry 168 and the exit 170 in the extraction and collection assembly 160, even if the direction of rotation of the infill extractors 200 is working against such movement. Reversing the direction of the infill extractors 200 may be beneficial near the end of a strip of synthetic turf in order to alter the speed at which the synthetic turf exits the extraction and collection assembly 160 and to prevent the synthetic turf from travelling too quickly therethrough. Thus, the invention contemplates structure for restraining a trailing edge of a strip of synthetic turf from being pulled prematurely into the extraction and collection assembly 160. Such structure may also include pacing rollers or pull devices, as will be discussed below. A control system is operatively connected to the infill extractors 200 and to at least one of the nipped rollers 152, 180, and is adapted to rotate the infill extractors 200 at a higher speed than the at least one of the nipped rollers 152, 180.

As the vehicle 20 moves along a field of synthetic turf, a strip of the synthetic turf is fed into the entry 168 of the extraction and collection assembly 160 and then replaced back onto the subsurface at the lower front end of the extraction and collection assembly 160, but with the infill removed therefrom. Advantageously, and because the strip of synthetic turf fits between the tracks 38 of the vehicle 20, the vehicle 20 does not disturb the ground or subsurface beneath the turf.

Notably, the vehicle 20 drives on the synthetic turf adjacent the strip of turf where infill is being removed from, so that the vehicle 20 is not driving directly on the subsurface below the synthetic turf. This greatly assists in minimizing the need for repair or rework of the subsurface, so that a new field can be put in as quickly and as efficiently as possible.

It is to be understood that the length of the strip removed from the surface is, when placed back on the surface in an unfilled condition, displaced from its original position along the path traversed by the vehicle. This is due to the fact that a certain length of strip is "taken up" within the apparatus. If it is desirable to eliminate all contact between the vehicle and the subsurface, a "dummy" lead section can be attached to the forward end of the strip, with this lead section being the same width as the strip and of a length needed to traverse the path from the front end of the ramp along the path through the extractor/collector and to the front of the extractor/collector, so that there will be no portion of uncovered subsurface as the vehicle moves over the strip.

As mentioned, the collection bin 184 includes a trough 188 having an opening 190 therein. Infill collected in the trough 188 is moved toward the opening 190 by an auger 192, and exits through the opening 190 and is directed to an elongated infill mover, in this case an endless conveyor belt 194 of an infill conveyor assembly 196. The opening 190 may be located near an end of the collection bin 184, for example. The conveyor belt 194 of the conveyor assembly 196 is upwardly and rearwardly directed, and may include a plurality of spaced partitions 198 for holding infill. The conveyor belt 194 directs the infill from the collection bin 184 toward an infill collection device, which in the embodiments shown is in the form of an infill collection trailer 201. A downward deflector is positioned at the terminal end of the conveyor belt to deflect the conveyed infill downward to the infill collection trailer below. Alternatively, the elongated infill mover may use an auger to move the infill from the collector bin 184 to the collector trailer 201.

At the terminal end of the conveyor belt 194, infill falls into the infill collection trailer 201. The infill collection trailer 201 generally connects with the infill extraction and collection attachment 140 via a hitch 203, and is pulled behind the vehicle 20. The hitch 203 could alternatively connect the trailer 201 to the vehicle 20. The trailer 201 includes a bottom surface 205, side walls 207, and a front wall 208, with a collection space 210 generally defined therebetween. There is no rear wall, which allows for the efficient removal of infill from the trailer 201. An upper framework 212 extends from the walls 207, 208 and includes upwardly extending arms 214 joined by connecting arms 216. Retaining levers 218 are provided on the upper framework 212 for holding the straps or handles 220 of a large bag 222, which is suspended in the trailer 201. The upper framework 212 and the retaining levers 218 form a sort of bracket configured to carry a container for infill, such as the bag 222, and to maintain it in an open condition. The infill can be collected in the bag 222, which may subsequently be removed from the trailer 201. To that end, the trailer 201 includes a ram 224, or push mechanism, for pushing the large bag 222 therefrom. The ram 224 includes a movement actuator 226, such as a cylinder 228 having a hydraulically activated piston 230 attached to the ram 224. Extension of the piston 230 pushes a bag 222 out of the trailer 201, which bag 222 may then be lifted and removed by suitable equipment (a fork of a fork-lift is shown). Of course, the handles 220 of the bag 222 would first be removed from the retaining levers 218 before attempting to remove the bag 222 from the trailer 201. The bag 222 can be removed from the trailer 201 after the trailer 201 reaches a pre-defined weight and/or volume limit for the bag 222, and the trailer 201 can include necessary measuring devices therefor. Also, the trailer 201 includes large and soft pneumatic tires 232.

The conveyor assembly 196 that moves the infill from the collection bin 184 to the infill collection trailer 201 may be selectively activated by a user, such as to momentarily suspend operation of the conveyor track 194 (or perhaps the auger 192). The collection bin 184 can be sufficiently sized so as not to require continuous augering and removal of infill therefrom, in order to allow the conveyor assembly 196 or the auger 192 to be momentarily suspended. Thereby, replacement or adjustment of the bag 222 in the trailer 201 can be achieved without suspending the entire operation.

FIG. 7E depicts components of an infill extraction and collection assembly 160' according to an alternative embodiment of an infill extraction and collection attachment. A turf conveyor assembly 144' used in association therewith does not include a nipped roller, as in the first nipped roller 152 of the embodiment discussed above. Furthermore, the synthetic turf does not follow a similarly shaped path as provided by the guide rail 172 of the embodiment discussed above. Rather, the synthetic turf follows a partially generally sinusoidal pathway defined by a partially generally sinusoidal shaped guide rail 172. As synthetic turf enters the extraction and collection assembly 160' at an entry 168', a first pacing roller 201 having a plurality of spaced engagement teeth engages the upper surface of the synthetic turf and urges the synthetic turf further into the extraction and collection assembly 160'. A first infill extractor 200' that is substantially similar to the infill extractor 200 discussed above contacts the synthetic turf on the lower surface thereof, and further urges the synthetic turf along its pathway and begins to beat the synthetic turf, thereby dislodging the infill therefrom. As the synthetic turf goes past the first infill extractor 200', a second pacing roller 201 engages the upper surface of the synthetic turf and pushes it further along its pathway. The synthetic turf is contacted by a third pacing roller 201 that engages the upper surface of the synthetic turf as the synthetic turf is being inverted. A fourth pacing roller 201 positioned generally below the first infill extractor 200 further engages the synthetic turf, and in this location the synthetic turf is completely inverted. A tension roller 203 is positioned after the fourth pacing roller 201 and engages the inverted upper surface of the synthetic turf. A second infill extractor 200 follows the tension roller 203 and contacts the synthetic turf on the inverted lower surface thereof. Finally, the guide rail 172' guides the synthetic turf out of the extraction and collection assembly 160' through an exit 170', and directs the synthetic turf back toward the ground, in a similar manner as the embodiment discussed above. The pacing rollers can be passive or driven, and if driven can be driven at any speed, including different speeds for different pacing rollers 201. Further, the tension roller 203 may also be passive or driven, and can be driven at any speed with respect to infill extractors 200' or the pacing rollers 201. Further still, the infill extractors 200' are driven, and may be driven at any appropriate speed with respect to one another or with respect to the pacing rollers 201 or the tension roller 203.

Referring next to FIGS. 8A-8C, 9A-9C, and 10, a turf rolling attachment 240 is shown that can be connected to the vehicle 20. The turf rolling attachment 240 is useful for removing synthetic turf from a field. Because of the movement involved, the turf rolling attachment 240 can also be referred to as a wind up attachment.

The turf rolling attachment 240 includes a frame 242 having attachment arms 244 for mating with the attachment arms 52 of the vehicle 20. Widthwise-extending and adjustable position arms 246 are attached to the frame 24. A position adjustment actuator 248 is provided for moving the arms 246 in the widthwise direction, and may include a hydraulic cylinder arrangement 250 that operates according to well known principles. Extension arms 252 are connected to the arms 246 and extend in a generally forward direction. First portions 254 thereof extend generally parallel with the attachment arms 244, and second portions 256 thereof extend from the first portions 254 in a further forward, but downward direction. Turf rolling assemblies 258 are located near a distal end of the second portions 256 away from the first portions 254. Each turf rolling assembly includes a hub 260 that is rotatably moveable with respect to the second portion 256. Tines 262 extend from each hub 260 toward the other hub 260, the tines being configured to grab and hold a portion of synthetic turf. A rotational movement actuator, such as a motor 264, is provided for rotating each hub 260. The hubs 260 may be rotated in either direction.

A strip of synthetic turf is placed around one or more of the tines 262, and the motor 264 can then rotate the hub 260, thereby rolling the synthetic turf up and into a roll, as shown. The distance between the respective turf rolling assemblies 258 can be adjusted. For example, before rolling a strip of synthetic turf, the arms 246 are moved into an appropriately-spaced orientation so the strip of synthetic turf fits between, but properly engages, the turf rolling assemblies 258. Once the strip of synthetic turf is rolled up, the arms 246 may again be moved, to move the turf rolling assemblies 258 away from each other, thereby releasing the roll of synthetic turf from the turf rolling attachment 240.

The turf rolling attachment 240 may be used with the vehicle 20 held stationary or with the vehicle 20 moving. For example, the vehicle 20 may be parked on the sidelines and off of the synthetic turf to be removed, and the synthetic turf is pulled by the turf rolling attachment 240 and rolled up. Advantageously, this approach allows the synthetic turf to be removed without driving the vehicle 20 over the subsurface below the synthetic turf, thereby limiting or eliminating any damage to the subsurface that would have to be repaired before a new synthetic turf is installed. Also, the turf rolling attachment may be used with the vehicle 20 driving across the field as the strip of synthetic turf is rolled up.

As shown in FIG. 10, after the infill is removed from synthetic turf by the infill extraction and collection attachment, it can be rolled up by the turf rolling attachment.

A roll of synthetic turf may be removed from the turf removal attachment and transported for reconditioning, recycling, or other disposal. Advantageously, the infill is removed from a strip of synthetic turf before it is removed from a field, but such is not required as the infill can be removed away from the field, such as at an off-site location, as discussed above.

Further, the vehicle 20 can be used in accordance with the teachings relating to the devices and methods disclosed in U.S. Patent Publication No. 2012/0067996, which is hereby incorporated by reference in its entirety. Particularly, the frame 16 of the '996 publication can be used as an attachment device that can be connected to the vehicle 20 for unrolling a roll of turf onto a field. In particular, the frame 16, along with the spindle 18 holding a roll 20 of synthetic turf, all of the '996 publication, can be used with the vehicle 20 herein as a turf installation attachment, and can be used for installing a new synthetic turf onto a field. Methods for using the vehicle 20 in conjunction with the frame 16 of the '996 publication will be evident from the teachings of the '996 publication.

Thus, when it is time to remove a synthetic turf field, the vehicle and attachment devices disclosed herein can be used. Particularly, the vehicle 20 can be used with the turf cutting attachment 90 to cut a synthetic turf field into strips. Then, the vehicle 20 can be used with the infill extraction and collection attachment 140 to remove the infill from the strips of synthetic turf. The infill can be collected, saved for subsequent use, or handled in any other way. Once the infill has been removed from the synthetic turf, the vehicle 20 can be used with the turf rolling attachment 240 to remove the strips of synthetic turf from the field, either with the vehicle 20 held stationary, or by driving the vehicle 20 across the field as the strips are rolled up. The vehicle 20 and the attachment devices disclosed herein allow the synthetic turf to be removed with minimal disruption of the underlying subsurface.

Alternatively, the vehicle 20 can be used with the turf cutting attachment 90 to cut a synthetic turf field into strips. The strips can then be rolled up using the vehicle 20 and the turf rolling attachment 240. Infill contained within the strips of synthetic turf can be removed at an off-site location, or the strips can be otherwise handled. For example, an off-site stationary device can include an infill extraction and collection component similar to the infill extraction and collection attachment assembly 160 disclosed herein.

Synthetic turf and infill recovered as disclosed herein can be handled in any desired manner. For example, the synthetic turf may be recycled, discarded, or reused. Likewise, the infill may be recycled, discarded, or reused.

The extraction and collection assembly 160 can also be used in circumstances other than in association with a motorized vehicle of the type shown in the Figures. For example, the extraction and collection assembly 160 can be mounted at a fixed off-site location for stationary operation. The strips of filled synthetic turf can be fed into the stationary extraction and collection assembly 160, at the extractor/collector site, and the infill removed therefrom. For example, strips of infilled synthetic turf may be removed from a distant field and then transferred to the extractor/collector site to recover the infill. Synthetic turf that exits the stationary extraction and collection assembly 160 can be further processed, such as rolled up into a roll or fed into a shredding machine, for example. The infill removed from the synthetic turf can be further processed, as well, or disposed of, as appropriate. Thus, the stationary extractor/collector site may be capable of serving an entire geographical region.

According to one aspect of the invention, the extraction and collection assembly 160 disclosed herein has the capability for directly engaging a leading edge of a strip of synthetic turf, such as at the edge of a field. In contrast, prior art devices have required that a lead-up strip be attached to synthetic turf, so that the lead-up strip can be fed into the prior art devices before the synthetic turf. The attachment of a lead-up strip to synthetic turf requires a user to physically connect the lead-up strip to the synthetic turf, and such lead-up strips can take several feet or yards of material. The present invention makes the use of such a lead-up strip unnecessary, and thereby saves time and resources that would otherwise be required by a lead up strip.

While chain and sprocket drive mechanisms are shown in association with the various devices in the figures, belts, pulleys, and other associated drive mechanisms are also considered appropriate and may be used in alternative embodiments.

Thus, by using the devices and methods disclosed herein, the present invention enables a synthetic turf to be cut into strips, the infill removed (i.e., extracted and collected) from the synthetic turf, the synthetic turf removed from a field, and a new synthetic turf installed in a relatively short time window. Advantageously, the present invention contemplates removal of a synthetic turf in a manner that does not disrupt the subsurface beneath the synthetic turf, or does so only to a small extent. The present invention contemplates removing the infill at the site and collecting the infill at the site in an infill collection trailer, or removing the infill at an off-site extractor/collector location. The removed infill can be reused, recycled, or disposed of as circumstances dictate. Also, the removed turf can be transported to a reconditioning, recycling, or disposal facility.

This specification shows and describes several preferred embodiments of the invention. However, those skilled in the art will appreciate that the disclosed embodiments are susceptible to a reasonable amount of modification and/or permutation, without departing from the overall scope of the invention. For instance, the dimensions of the components shown and described, and/or the relationships of those dimensions to other components may vary, as needed, in order to apply the general principles of the present invention to the actual circumstances at hand. Moreover, it is to be understood that the recitation of "objects of the invention" in this specification is not intended to be construed as an admission that others have recognized the same problems or perceived the same limitations in the state of the art, as recognized by the present inventors. Moreover, the recitation of the objects of the invention is also not intended to require each of the following claims to achieve all of the above-stated objects. Rather, the recitation of the objects of the invention in this specification is intended merely to help explain the story behind the present invention, and to explain why the present invention represents an advance in the state of the art over existing technology. Accordingly, the inventors intend that the scope of the appended claims are not to be limited by the specific details shown or described herein, or by the "objects" described above.

We claim:

1. A turf winding apparatus for winding a strip of artificial turf, the strip having a width defined by opposite longitudinal edges, comprising:
   a frame having an elongated member and a pair of spaced arms extending in a first direction from the elongated member;
   a pair of opposing winding units, each winding unit located at a respective first end of one of the spaced arms, the winding units aligned along a first axis; and
   each of the winding units further including a base secured to the respective arm, a hub rotatable relative to the base, a holder mounted to and rotatable with the hub, and a drive source operatively connected to the hub to rotatably drive the hub, whereby, with the holders engaging the opposite edges of the strip, the hubs are rotatable so as to wind the strip of artificial turf about the first axis to place the turf in a rolled up orientation.

2. The turf winding apparatus of claim 1 further comprising:
   a motorized vehicle releasably secured to the frame; and
   a power source and a controller carried by the vehicle and operatively connected with the two drive sources, thereby to power and to control the rotation of the winding units.

3. The turf winding apparatus of claim 2 wherein each of the drive sources includes a set of hydraulic lines, each set of hydraulic lines operatively connected to one of the drive sources and also to the power source.

4. The turf winding apparatus of claim 2 wherein the frame is vertically movable relative to the vehicle.

5. The turf winding apparatus of claim 1 wherein each of the holders further includes a plurality of tines.

6. The turf winding apparatus of claim 1 wherein the elongated member is extendable and retractable along a second axis that is parallel to the first axis, thereby to enable the elongated member to be extended and retracted, respectively, so as to move the winding units farther apart and closer together along the first axis, respectively.

7. The turf winder of claim 6 further comprising:
   a position adjustment actuator for controlling the extending and retracting of the elongated member.

8. A turf winding apparatus for winding a strip of artificial turf, the strip having a width defined by opposite longitudinal edges, comprising:
   a motorized vehicle,
   a frame releasably secured to the vehicle and having an elongated member and a pair of spaced arms extending in a first direction from the elongated member;
   a pair of opposing winding units, each winding unit located at a respective first end of one of the spaced arms, the winding units aligned along a first axis; and
   each of the winding units further including a base secured to the respective arm, a hub rotatable relative to the base, a holder mounted to and rotatable with the hub, and a drive source operatively connected to the vehicle and to the hub to rotatably drive the hub, whereby, with the holders engaging the opposite edges of the strip, the hubs are rotatable so as to wind the strip of artificial turf about the first axis to place the turf in a rolled up orientation.

\* \* \* \* \*